(12) United States Patent
Nittou

(10) Patent No.: US 8,654,065 B2
(45) Date of Patent: Feb. 18, 2014

(54) LIQUID CRYSTAL DISPLAY UNIT, CONTROL METHOD FOR LIQUID CRYSTAL DISPLAY UNIT, AND GAMING DEVICE

(75) Inventor: Eiji Nittou, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 727 days.

(21) Appl. No.: 12/933,687

(22) PCT Filed: Dec. 25, 2008

(86) PCT No.: PCT/JP2008/073605
§ 371 (c)(1),
(2), (4) Date: Sep. 21, 2010

(87) PCT Pub. No.: WO2009/118969
PCT Pub. Date: Oct. 1, 2009

(65) Prior Publication Data
US 2011/0018913 A1    Jan. 27, 2011

(30) Foreign Application Priority Data
Mar. 26, 2008   (JP) .................................. 2008-081688

(51) Int. Cl.
*G09G 3/36* (2006.01)

(52) U.S. Cl.
USPC ......................................................... 345/102

(58) Field of Classification Search
USPC ................................................ 345/690, 102
See application file for complete search history.

(56) References Cited

U.S. PATENT DOCUMENTS

| | | | |
|---|---|---|---|
| 6,776,497 B1 * | 8/2004 | Huppi et al. | ..................... 362/85 |
| 2004/0219965 A1 | 11/2004 | Okada | |

FOREIGN PATENT DOCUMENTS

| | | | |
|---|---|---|---|
| JP | 2001-346969 A | | 12/2001 |
| JP | 2004-073654 A | | 3/2004 |
| JP | 2005-185624 A | | 7/2005 |
| JP | 2006-158682 | * | 6/2006 |
| JP | 2006-158682 A | | 6/2006 |
| JP | 2007-215983 A | | 8/2007 |
| JP | 2007-275313 A | | 10/2007 |
| WO | 2008/032465 A1 | | 3/2008 |

OTHER PUBLICATIONS

Official Communication issued in International Patent Application No. PCT/JP2008/073605, mailed on Jan. 27, 2009.

* cited by examiner

*Primary Examiner* — Abbas Abdulselam
*Assistant Examiner* — Shawna Stepp Jones
(74) *Attorney, Agent, or Firm* — Keating & Bennett, LLP

(57) ABSTRACT

What is provided is a liquid crystal display unit (1), including: a first liquid crystal display element (2) for displaying an image; an accessory (4) provided behind the first liquid crystal display element (2); and a surface light source (3) provided between the first liquid crystal display element (2) and the accessory (4), the surface light source (3) being movable, and the surface light source (3) being moved (i) so that the accessory (4) is shielded in a first case where the image, displayed by the first liquid crystal display element (2), is viewed by a primary viewer of the first liquid crystal display element (2) and (ii) so that the accessory (4) is not shielded in a second case where the accessory (4) is viewed by the primary viewer. This makes it possible to fully shield, with a simple configuration, the accessory provided behind a liquid crystal display device.

17 Claims, 14 Drawing Sheets

(a)

(b)

(c)

LIQUID CRYSTAL DISPLAY UNIT, CONTROL METHOD FOR LIQUID CRYSTAL DISPLAY UNIT, AND GAMING DEVICE

TECHNICAL FIELD

The present invention relates to a liquid crystal display unit, a method of controlling a liquid crystal display unit, and a gaming device. The present invention particularly relates to a liquid crystal display unit, a method of controlling a liquid crystal display unit, and a gaming device each capable of switching between a state in which an accessory is shielded and a state in which the accessory is not shielded.

BACKGROUND ART

Conventionally, a liquid crystal display element has been widely used as a component of an information display section in a gaming device such as a pinball machine.

A recent gaming device is required to be capable of displaying, in its information display section, (i) information to be displayed on the liquid crystal display element and (ii) an accessory etc. provided behind the liquid crystal display element. This will be described below with reference to FIG. 12, which illustrates how a gaming device is schematically configured, and with reference to (a) through (c) of FIG. 13, each of which illustrates a display in an information display section of the gaming device.

As illustrated in FIG. 12, a gaming device 90 includes, on its front surface, a circular game board 92 via which a game player can view how a game is developing. The game board 92 includes, at its substantially central portion, an information display section 94 which is mainly constituted by a liquid crystal display element.

The information display section 94 displays various kinds of information depending on a situation of the game. As illustrated in (a) of FIG. 13, in a case where the information display section 94 displays three figures in accordance with a situation of the game, like a slot machine, the information display section 94 displays the figures such as "567" as an image of the liquid crystal display element.

In a case where all the three figures become identical (e.g., "777") as illustrated in (b) of FIG. 13, a region where the midmost figure "7" is displayed becomes transparent. This causes the information display section 94 to display (i) the two figures "7" and "7" displayed on the liquid crystal display element and (ii) an accessory 52 (doll) provided, in advance, behind the liquid crystal display element (see (c) of FIG. 13).

In order to achieve such a display which employs (i) the image displayed on the liquid crystal display element and (ii) the accessory, there have been proposed a variety of techniques.

For example, Patent Literature 1 discloses a technique of using a polymer-dispersed liquid crystal element as an LCD shutter. This technique is described below with reference to FIGS. 14 through 17. FIG. 14 is an elevation view illustrating an overall configuration of a gaming machine disclosed in Patent Literature 1. As illustrated in FIG. 14, a gaming machine 101 of Patent Literature 1 includes a game board 106, which includes a center case 111 at its central portion. An image display device 108 which displays an image is provided in the center case 111.

Specifically, the center case 111 is mainly made up of an armor section 409, the image display device 108, and an accessory 506 provided behind the image display device 108 (see FIG. 15, which is an exploded perspective view illustrating how the center case 111 is configured).

The image display device 108 mainly includes a first liquid crystal panel 501, diffusing plates 502, a light guide plate 503, a reflecting plate 504, and an LCD shutter 505, which are arranged in this order (see FIG. 16, which illustrates how the image display device 108 is configured). The image display device 108 further includes (i) an LCD light emitting element 513, for an image display, which is provided in the vicinity of an end of the light guide plate 503 and (ii) a light emitting element 514, for an accessory, which is provided in the vicinity of an end of the LCD shutter 505.

According to the gaming machine 101 of Patent Literature 1, the LCD shutter 505 which constitutes the image display device 108 is realized by a polymer-dispersed liquid crystal display element. The polymer-dispersed liquid crystal display element allows switching between states where (i) the accessory 506 is visible and (ii) the accessory 506 is not visible. This will be described below with reference to (a) and (b) of FIG. 17, each of which is an explanatory view illustrating an operation principle of the polymer-dispersed liquid crystal display element which constitutes the LCD shutter 505. (a) of FIG. 17 illustrates how liquid crystal molecules are oriented while a voltage is being applied, and (b) of FIG. 17 illustrates how the liquid crystal molecules are aligned while no voltage is applied.

As illustrated in (a) and (b) of FIG. 17, transmitting of the polymer-dispersed liquid crystal display element differs depending on whether or not a voltage is applied to its liquid crystal layer. Specifically, as illustrated in (a) of FIG. 17, the incident light transmits the polymer-dispersed liquid crystal display element while a voltage is being applied to the liquid crystal layer (LCD shutter 505: ON). In this state, the accessory 506 provided behind the image display device 108 is visible to a game player.

In contrast, as illustrated in (b) of FIG. 17, the incident light is scattered by the polymer-dispersed liquid crystal display element while no voltage is applied to the liquid crystal layer. This causes the liquid crystal layer to become clouded (LCD shutter 505: OFF). In this state, the accessory 506 provided behind the image display device 108 is not visible to the game player.

As described above, since the gaming machine 101 of Patent Literature 1 employs the polymer-dispersed liquid crystal display element, it is possible to control whether the accessory 506 provided behind the image display device 108 is visible or invisible (shielded or not shielded).

Patent Literature 2 discloses a configuration in which a reel 604 having designs is employed (see FIG. 18). FIG. 18 is a cross-sectional view illustrating a panel display section of Patent Literature 2.

According to the configuration of Patent Literature 2, (i) picture sheets 600 which are made of transparent films and on which various pictures are printed, (ii) a performance display section 601 which is constituted by a liquid crystal display device constituted by for example ITO, and (iii) an electronic shutter section 602 constituted by a liquid crystal film or the like are stacked on an inner surface side of a panel display section 606 made of a transparent acrylic plate (see FIG. 18). At a bottom part and an upper part on the inner surface side of the panel display section 606, there are provided first and second cold cathode fluorescent lamps (CCFL) 603 which serve as (i) a backlight for a liquid crystal display and (ii) an illumination device for illuminating the patterns on the reel 604, respectively.

The panel display section 606, the picture sheets 600, the performance display section 601, and the electronic shutter section 602 as a whole serve as a part which displays a performance.

The following description discusses operations of the above constituent elements. The pictures printed on the picture sheets 600 are always visible to a game player regardless of a state of the performance of the pachinko-slot machine.

In contrast, the performance display section 601 is a display region where an image performance such as a jackpot performance and various announcement performances are displayed.

The electronic shutter section 602 switches between a transmitting state and a shielded state in a predetermined region in accordance with a voltage applied to the electronic shutter section 602. That is, the electronic shutter section 602 switches between states where (i) a design on the reel 604 is visible through the panel display section 606 and (ii) the design on the reel 604 is not visible. This allows the performance made by the performance display section 601 to be switched between (a) a normal state where only the performance display is visible because the designs on the reel 604 are shielded by the electronic shutter section 602 and (b) a translucent state where both the performance display and a design, on the reel 604 provided behind the panel display section 606, are visible.

CITATION LIST

Patent Literature 1

Japanese Patent Application Publication, Tokukai, No. 2005-185624 A (Publication Date: Jul. 14, 2005)

Patent Literature 2

Japanese Patent Application Publication, Tokukai, No. 2004-073654 A (Publication Date: Mar. 11, 2004)

SUMMARY OF INVENTION

However, the conventional gaming machine disclosed in Patent Literature 1 causes a problem that the accessory provided behind the image display device cannot be fully shielded.

The reason therefor is as follows. Specifically, according to the conventional gaming machine, the accessory provided behind the image display device is shielded with use of the polymer-dispersed liquid crystal display element. In other words, as described earlier, since the incident light is scattered when no voltage is applied, the polymer-dispersed liquid crystal display element becomes clouded. This allows the accessory provided behind the polymer-dispersed liquid crystal display element to be shielded.

According to the above method, however, the polymer-dispersed liquid crystal display element becomes clouded by the scattering of the incident light. This causes a contour of the accessory to look blurry and color to be unclear. In that situation, the accessory is still dimly recognizable.

The game player has already been aware of the presence of the accessory when the polymer-dispersed liquid crystal display element is in the light-scattering state. Therefore, the game player is not moved so much when the polymer-dispersed liquid crystal display element is switched from a light-scattering state to a light-transmitting state so that the accessory becomes clearly visible to the game player.

In addition, the configuration of Patent Literature 1 includes, in its LCD shutter 505, no means (e.g., a light guide, a reflecting sheet, a diffusing plate for diffusing light, and an optical sheet such as a diffusing sheet for converging and scattering light) for uniformizing luminance. This causes a deterioration in image quality, such as nonuniformity of luminance, of the image display device 108, when the LCD shutter 505 is in an OFF state (when the polymer-dispersed liquid crystal display element is in the light-scattering state).

Further, the configuration of Patent Literature 1 includes two kinds of light emitting elements, i.e., the LCD light emitting element 513 for the image display and the light emitting element 514 for the accessory. Such a configuration causes a problem in terms of efficient use of the light emitting elements.

Furthermore, the configuration of Patent Literature 2 includes, in its electronic shutter section 602, no means (e.g., a light guide, a reflecting sheet, a diffusing plate for diffusing light, and an optical sheet such as a diffusing sheet for converging and scattering light) for uniformizing luminance. This causes a deterioration in image quality, such as nonuniformity of luminance, as is the case with the configuration of Patent Literature 1.

Moreover, the configuration of Patent Literature 2 includes the cold cathode fluorescent lamps (CCFL) 603 which serve as (i) the backlight for liquid crystal display and (ii) the illumination device for illuminating the patterns on the reel 604, respectively. Such a configuration causes a problem in terms of efficient use of the light emitting elements, as is the case with the configuration of Patent Literature 1.

The present invention has been made of the above problems, and an object of the present invention is to provide a liquid crystal display unit, a control method for a liquid crystal display unit, and a gaming device, each of which is capable of fully shielding, with a simple configuration, an accessory provided behind a liquid crystal display element. Further, another object of the present invention is to provide a liquid crystal display unit, a control method for a liquid crystal display unit, and a gaming device, each of which efficiently uses a light source and has a high uniformity of luminance.

In order to attain the above object, a liquid crystal display unit of the present invention includes: a first liquid crystal display element for displaying an image; an accessory provided behind the first liquid crystal display element; and a surface light source provided between the first liquid crystal display element and the accessory, the surface light source being movable, and the surface light source being moved (i) so that the accessory is shielded in a first case where the image, displayed by the first liquid crystal display element, is viewed by a primary viewer and (ii) so that the accessory is not shielded in a second case where the accessory is viewed by the primary viewer.

In order to attain the above object, a control method of a liquid crystal display unit of the present invention is a method of controlling a liquid crystal display unit, the liquid crystal display unit including: a first liquid crystal display element for displaying an image; an accessory provided behind the first liquid crystal display element; and a surface light source provided between the first liquid crystal display element and the accessory, said method switching between (i) displaying of the image displayed by the first liquid crystal display with respect to a primary viewer and (ii) displaying of the accessory with respect to the primary viewer, the surface light source being movable, said method, including the steps of: causing the surface light source to move (i) so that the accessory is shielded in a first case where the image, displayed by the first liquid crystal display element, is viewed by a primary viewer and (ii) so that the accessory is not shielded in a second case where the accessory is viewed by the primary viewer.

According to the configuration and the method, the surface light source being movable (hereinafter referred to as a movable surface light source) has a function of shielding the accessory from the viewer of the first liquid crystal display element (i.e., a viewer of the liquid crystal display unit).

According to a conventional configuration, the accessory provided behind the liquid crystal display element is shielded with use of for example a polymer-dispersed liquid crystal display element etc. In other words, since the incident light is scattered when no voltage is applied, the polymer-dispersed liquid crystal display element becomes clouded. This allows the accessory provided behind the polymer-dispersed liquid crystal display element to be shielded.

According to the above method, however, the polymer-dispersed liquid crystal display element becomes clouded by the scattering of the incident light. This causes a contour of the accessory to look blurry and color to be unclear. In that situation, the accessory is still dimly recognizable.

In contrast, according to the present invention, the surface light source is movable. Such a movable surface light source itself is used as means for shielding the accessory.

By causing such a movable surface light source to serve as shielding means, it is possible to achieve a liquid crystal display unit and a control method for a liquid crystal display unit each of which has a simple configuration and is excellent in shielding of the accessory.

The liquid crystal display unit of the present invention is preferably configured such that, in the first case, the surface light source is moved so as to backlight the first liquid crystal display element; and in the second case, the surface light source is moved so as to irradiate the accessory with light emitted from the surface light source.

The control method for the liquid crystal display unit of the present invention is preferably configured such that, in the first case, the surface light source is moved so as to backlight the first liquid crystal display element; and in the second case, the surface light source is moved so as to irradiate the accessory with light emitted from the surface light source.

A conventional liquid crystal display unit included two light sources, i.e., (i) a light source serving as a backlight for irradiating a liquid crystal display element on which an image is displayed and (ii) a light source for irradiating an accessory. Therefore, the conventional liquid crystal display unit caused a problem that it included two separate light sources and thus use efficiency of the light sources was low.

In contrast, the above configuration and method each employ the movable surface light source. Accordingly, it is possible to move, in the case where the accessory is viewed by the viewer of the liquid crystal display unit, the movable surface light source so as to irradiate the accessory with light.

Further, it is possible to move, in the case where the accessory is shielded from the viewer of the liquid crystal display unit so that the image displayed by the first liquid crystal display element is viewed by the viewer, the surface light source so as to backlight the first liquid crystal display element.

Accordingly, the liquid crystal display unit is configured to necessitate a single light source. This allows an improvement in the use efficiency of the light source.

Further, the conventional liquid crystal display unit was configured for example such that the light scattered in the polymer-dispersed liquid crystal display element is directly used as light with which the liquid crystal display element is irradiated from behind. This caused a problem that in-plane uniformity of luminance was not excellent when the image was displayed by the liquid crystal display element.

In contrast, the movable surface light source is configured such that the surface light source having high uniformity of luminance is moved. Accordingly, it is possible to obtain light, having high uniformity of luminance, with which the liquid crystal display element is irradiated from behind.

As such, according to the configuration, it is possible to provide a liquid crystal display unit and a control method for a liquid crystal display unit, each of which (i) fully shields the accessory provided behind a liquid crystal display device, (ii) efficiently uses the light source, and (iii) has high in-plane uniformity of luminance.

The liquid crystal display unit of the present invention is preferably configured such that, in the first case, the surface light source is moved so that a light-emitting surface of the surface light source faces a back surface of the first liquid crystal display element.

According to the configuration, the light-emitting surface of the surface light source faces the back surface (i.e., a surface opposite to a front surface that is viewed by the viewer of the first liquid crystal display element) of the first liquid crystal display element. Accordingly, it is possible to efficiently use, as light with which the first liquid crystal display element is irradiated from behind, the light emitted from the surface light source.

Further, it is possible to easily improve in-plane uniformity of luminance of the image displayed by the first liquid crystal display element.

The liquid crystal display unit of the present invention is preferably configured such that the first liquid crystal display element has a non-display region in which no image is displayed, and in the second case, the surface light source is moved so as to be behind the non-display region when it is seen from the primary viewer.

According to the configuration, in the case where the accessory is viewed by the viewer, the surface light source is hidden behind the non-display region of the first liquid crystal display element, in which region the image displayed by the first liquid crystal display element is not displayed. Accordingly, the surface light source hardly comes into sight of the viewer, and thus the accessory is sufficiently viewed by the viewer because there is no obstacle standing in the way.

The liquid crystal display unit of the present invention is preferably configured such that the non-display region is located in a peripheral part of the first liquid crystal display element.

According to the configuration, the non-display region is located in the peripheral part of the first liquid crystal display element. Accordingly, the non-display region provided on the first liquid crystal display element hardly interrupts the display of the first liquid crystal display element.

The liquid crystal display unit of the present invention is preferably configured such that the surface light source includes a light-emitting element and a light-diffusing section, and the light-diffusing section diffuses, in a light-emitting surface of the surface light source, light emitted from the light-emitting element.

According to the configuration, the surface light source includes the light-diffusing section. This makes it possible to improve in-plane uniformity of luminance of the surface light source.

Further, according to the configuration, the diffusion of the light in the light-diffusing section makes it hard for the viewer to view anything behind the surface light source. This makes it possible to more completely shield the accessory.

The liquid crystal display unit of the present invention is preferably configured such that the surface light source further includes a reflecting section for causing the light emitted from the light-emitting element to be emitted through the light-emitting surface.

The liquid crystal display unit of the present invention is preferably configured such that the reflecting section is provided on a back surface of the surface light source, the back surface being opposite to the light-emitting surface, and the reflecting section includes a reflecting sheet.

According to the configuration, the surface light source includes the reflecting section. More preferably, the reflecting section includes the reflecting sheet. This makes it possible to more efficiently emit, from the surface light source, the light emitted from the light-emitting element that is included in the surface light source.

Further, according to the configuration, the light is reflected. This makes it hard for the viewer to view anything behind the surface light source. As such, it is possible to more completely shield the accessory.

In other words, since the surface light source includes the light-diffusing section and the reflecting section, it becomes difficult that the light transmits the surface light source. This makes it harder for the viewer to view anything behind the surface light source. Accordingly, it is possible to more fully shield the accessory.

The liquid crystal display unit of the present invention is preferably configured such that the surface light source includes a rotation device; and the rotation device rotates and moves the surface light source so as to cause the accessory to be shielded or the accessory not to be shielded.

The liquid crystal display unit of the present invention is preferably configured such that the rotation device includes: a rotation motor; and a rotation control section for controlling rotation of the rotation motor.

According to the configuration, the rotation device is provided as means for causing the surface light source to be movable. As such, it is possible to easily cause the surface light source to be movable.

Further, in a case where the rotation device includes the rotation motor, it is possible to easily control the movement of the surface light source by the rotation control section controlling the rotation motor.

The liquid crystal display unit of the present invention is preferably configured such that the surface light source is divided into a plurality of regions on a light-emitting surface of the surface light source; and each of the plurality of regions is independently rotatable on a side of a corresponding one of the plurality of regions, which side faces a borderline by which the surface light source is divided.

The liquid crystal display unit of the present invention is preferably configured such that the surface light source is divided into two regions which are adjacent to each other in a horizontal direction when it is seen from the primary viewer.

According to the configuration, the surface light source is divided into the plurality of regions, each of which is independently rotatable on the side of the corresponding one of the plurality of regions, which side faces the borderline by which the surface light source is divided. Accordingly, it is possible to reduce a region in which the accessory cannot be provided because the surface light source should rotate within the region.

Particularly in a case where the surface light source is divided in such a way that the divided regions are adjacent to each other in the horizontal direction, the accessory to be provided is less limited in its height. Specifically, for example, it is possible to easily provide an accessory larger in its height.

Further, it is preferable that the liquid crystal display unit of the present invention further include: a second liquid crystal display element provided between the first liquid crystal display element and the surface light source, the second liquid crystal display element serving as a shutter.

The control method for the liquid crystal display unit of the present invention is preferably configured such that the liquid crystal display unit further includes a second liquid crystal display element provided between the first liquid crystal display element and the surface light source, the second liquid crystal display element serving as a shutter; and said method further including the step of: causing the second liquid crystal display element to serve as a closed shutter while the surface light source is moving.

According to the configuration and the method, there is provided the second liquid crystal display element between the first liquid crystal display element and the surface light source, the second liquid crystal display element having a shutter function. Accordingly, it is possible to hide, from the viewer, the movement of the surface light source, by setting on the shutter function of the second liquid crystal display element.

Further, in the case where the accessory is shielded from the viewer, the configuration and the method make it possible, by setting on the shutter function of the second liquid crystal display element, to more completely shield the accessory.

The liquid crystal display unit of the present invention is preferably configured such that the second liquid crystal display element is a polymer-dispersed liquid crystal display element.

The control method for the liquid crystal display unit of the present invention is preferably configured such that the second liquid crystal display element which serves as the shutter is a polymer-dispersed liquid crystal display element; and a state in which the second liquid crystal display element serves as the closed shutter corresponds to a state in which the polymer-dispersed liquid crystal display element is in a light-scattering state.

According to the configuration and the method, the polymer-dispersed liquid crystal display element is used as the second liquid crystal display element. This makes it possible to easily cause the second liquid crystal display element to have the shutter function.

That is, it is possible, by causing the polymer-dispersed liquid crystal display element to be in the light-scattering state, to easily set on the shutter function of the second liquid crystal display element.

Further, in the case where the accessory is shielded from the viewer of the liquid crystal display unit, it is possible to scatter the light emitted from the surface light source by (i) causing the polymer-dispersed liquid crystal display element (i.e., the second liquid crystal display element) to be in the light-scattering state and then (ii) making use of the light-scattering state. This makes it possible to further improve in-plane uniformity of luminance of the image displayed by the first liquid crystal display element.

A gaming device of the present invention preferably includes the above liquid crystal display unit.

The configuration can provide a gaming device capable of displaying powerful images with higher quality by using a liquid crystal display unit and a control method for a liquid crystal display unit, each of which (i) fully shields the accessory provided behind the liquid crystal display element, (ii) achieves high uniformity of luminance, and (iii) achieves high use efficiency of the light-emitting element.

For a fuller understanding of the nature and advantages of the invention, reference should be made to the ensuing detailed description taken in conjunction with the accompanying drawings.

BRIEF DESCRIPTION OF DRAWINGS

FIG. 1 is a perspective view schematically illustrating how a liquid crystal display unit of an embodiment of the present invention is configured.

FIG. 2 is a cross-sectional view schematically illustrating how a surface light source of the embodiment of the present invention is configured.

FIG. 3, showing the embodiment of the present invention, is a view illustrating the liquid crystal display unit which displays only an image displayed by a first liquid crystal display element. (a) of FIG. 3 illustrates how the liquid crystal display unit looks in a case where it is viewed from a direction in which a primary viewer of the first liquid crystal display element views. (b) of FIG. 3 illustrates how the liquid crystal display unit is schematically configured in a case where it is viewed from a lateral side of the liquid crystal display unit.

FIG. 4, showing the embodiment of the present invention, is a view illustrating the liquid crystal display unit which displays only accessories. (a) of FIG. 4 illustrates how the liquid crystal display unit looks in a case where it is viewed from a direction in which a primary viewer views. (b) of FIG. 4 illustrates how the liquid crystal display unit is schematically configured in a case where it is viewed from a lateral side of the liquid crystal display unit.

FIG. 5 is a perspective view schematically illustrating how the liquid crystal display unit of the embodiment of the present invention is configured.

FIG. 6 is a block diagram schematically illustrating how a control system of the liquid crystal display unit is configured in the embodiment of the present invention.

FIG. 7 is a perspective view schematically illustrating how a liquid crystal display unit of another embodiment of the present invention is configured.

FIG. 8, showing the another embodiment of the present invention, is a view illustrating the liquid crystal display unit which displays only an image displayed by a first liquid crystal display element. (a) of FIG. 8 illustrates how the liquid crystal display unit looks in a case where it is viewed from a direction in which a primary viewer of the first liquid crystal display element views. (b) of FIG. 8 illustrates how the liquid crystal display unit is schematically configured in a case where it is viewed from a lateral side of the liquid crystal display unit.

FIG. 9, showing the another embodiment of the present invention, is a view illustrating the liquid crystal display unit which displays only accessories. (a) of FIG. 9 illustrates how the liquid crystal display unit looks in a case where it is viewed from a direction in which a primary viewer views. (b) of FIG. 9 illustrates how the liquid crystal display unit is schematically configured in a case where it is viewed from a lateral side of the liquid crystal display unit.

FIG. 10 is a block diagram illustrating how a control system of the liquid crystal display unit is configured in the another embodiment of the present invention.

FIG. 11 is a top view illustrating how a liquid crystal display unit of still another embodiment is schematically configured. (a) of FIG. 11 illustrates the liquid crystal display unit in which a surface light source is closed. (b) of FIG. 11 illustrates the liquid crystal display unit in which the surface light source is open.

FIG. 12 is a view schematically illustrating a gaming device.

FIG. 13 is an enlarged view of an information display section of the gaming device. (a) through (c) of FIG. 13 illustrate displays of the information display section.

FIG. 14, showing a conventional art, is an elevation view illustrating an overall configuration of a gaming machine disclosed in Patent Literature 1.

FIG. 15 is an exploded perspective view illustrating how a center case of the gaming machine disclosed in Patent Literature 1 is configured.

FIG. 16 is an exploded perspective view based on which to explain how an image display device of the gaming machine disclosed in Patent Literature 1 is configured.

FIG. 17 is an explanatory diagram illustrating an operation principle of a polymer-dispersed liquid crystal serving as an LCD shutter. (a) of FIG. 17 illustrates how liquid crystal molecules are oriented while a voltage is being applied. (b) of FIG. 17 illustrates how the liquid crystal molecules are aligned when no voltage is applied.

FIG. 18 is a cross-sectional view illustrating a panel display section disclosed in Patent Literature 2.

REFERENCE SIGNS LIST

1 Liquid Crystal Display Unit
2 First Liquid Crystal Display Element
2B Non-display Region
3 Surface Light Source
3S Light-emitting Surface
4 Accessory
7 Light-emitting Element
8 Light Guide (Light-diffusing Section)
8a Back Surface
8b Light-emitting Surface
9 Reflecting Sheet
10 Optical Sheet (Light-diffusing Section)
12 Rotation Device
13 Rotation Motor (Rotating Type Motor)
14 Rotation Control Section
17 Second Liquid Crystal Display Element
90 Gaming Device

DESCRIPTION OF EMBODIMENTS

The following description discusses, in detail, exemplary embodiments of the present invention with reference to the drawings. Note however that, unless otherwise stated, size, material, shape, and relative arrangement etc. of constituents which are described in the embodiments are not limited to those described in the embodiments, and are mere examples by which to explain the embodiments.

A liquid crystal display unit, a control method for a liquid crystal display unit, and a gaming device of an embodiment of the present invention are capable of (i) fully shielding an accessory provided behind a liquid crystal display element, (ii) achieving high uniformity of luminance, and (iii) achieving high use efficiency of a light source. The embodiments of the present invention are described below with reference to FIGS. 1 through 12.

Embodiment 1

(Liquid Crystal Display Unit)

Figure 1:
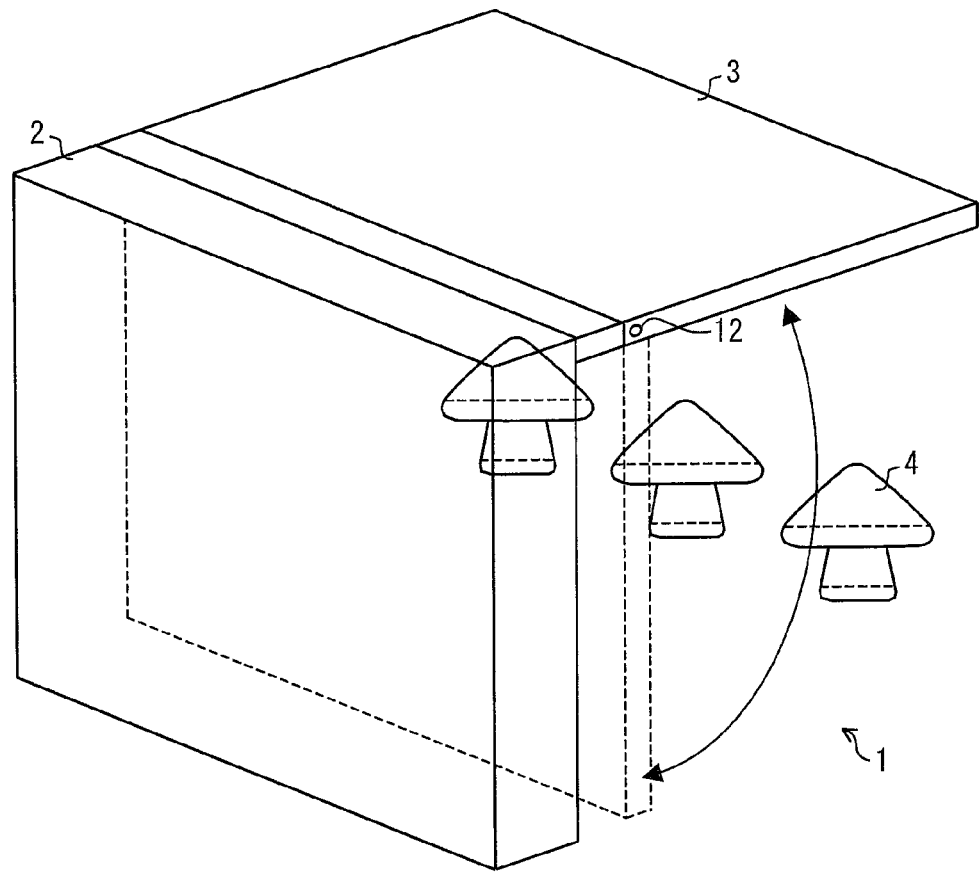
FIG. 1

FIG. 1 is a perspective view schematically illustrating how a liquid crystal display unit of an embodiment of the present invention is configured.

As illustrated in FIG. 1, a liquid crystal display unit 1 of the present embodiment includes a first liquid crystal display element 2, accessories 4, and a surface light source 3. The accessories 4 are provided behind the first liquid crystal display element 2, and the surface light source 3 is provided between the first liquid crystal display element 2 and the accessories 4.

The liquid crystal display unit 1 switches, by causing the surface light source 3 to rotate, between (i) displaying of an image displayed by the first liquid crystal display element 2 (ii) displaying of the accessories 4.

A conventionally and commonly-used liquid crystal display panel, such as a passive matrix liquid crystal display panel or an active matrix liquid crystal display panel, can be used as the first liquid crystal display element 2. A monochrome liquid crystal display panel or a multi-color liquid crystal display panel can be used as the liquid crystal display panel.

In order to provide more powerful images with higher quality, the present embodiment employs such a so-called active matrix multi-color liquid crystal display panel. The active matrix multi-color liquid crystal display panel includes (i) an active matrix substrate on which a plurality of thin film transistors (TFTs) are provided, (ii) a color filter (CF) substrate which faces the active matrix substrate, and (iii) a liquid crystal layer which is sandwiched between the substrates (i) and (ii) and is sealed with use of a sealing agent.

(Surface Light Source)

Figure 2:
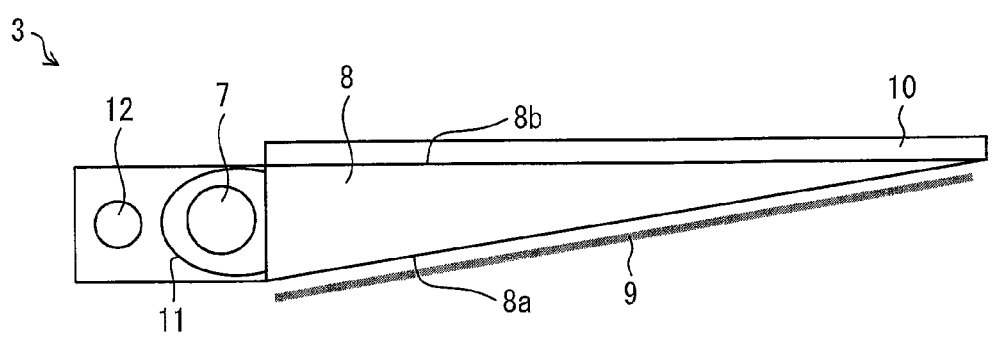
FIG. 2

The following description discusses the surface light source 3, which is provided behind the liquid crystal display element 2, with reference to FIG. 2. FIG. 2 is a cross-sectional view schematically illustrating how a surface light source of an embodiment in accordance with the present invention is configured. Note here that FIG. 2 illustrates an exemplary configuration in which the surface light source employs a bar-shaped light source as a light-emitting element.

As illustrated in FIG. 2, the surface light source 3 of the present embodiment includes a light-emitting element 7, a light guide 8, a reflecting sheet 9, an optical sheet 10, a reflecting sheet 11 for the light-emitting element, and a rotation device 12. The light guide 8 and the optical sheet 10 serve as a light-diffusing section for diffusing, in a light-emitting surface of the surface light source 3, light emitted from the light-emitting element 7.

Specifically, a bar-shaped light-emitting element, such as a cold cathode fluorescent lamp (CCFL), is used as the light-emitting element 7. Alternatively, (i) a dot-shaped light-emitting element such as a side light-emitting type LED or (ii) a side light-emitting type LED in which R, G, and B chips are molded in a single package can be used as the light-emitting element 7.

The light guide 8 is not particularly limited to a specific kind etc., provided that the light guide 8 can transform light, which is emitted from the light-emitting element 7 such as the bar-shaped light-emitting element or the dot-shaped light-emitting element, into surface light. For example, a light guide 8 that has a so-called wedge shape whose thickness decreases with an increase in distance from the light-emitting element 7 (see FIG. 2).

The surface light source 3 is preferably a surface light source of side light type as illustrated in FIG. 2, in view of easy rotatability (thin and light) of and luminance uniformity of the surface light source 3.

The light guide 8 can be made of transparent resin such as acrylic resin, cyclo olefin polymer (COP; e.g., Zeonor [product name]), cyclo olefin copolymer (COC), or polycarbonate. Note, however, that the material of the light guide 8 is not limited to one of those materials, and therefore can be made of a material that is commonly used as a light guide.

The reflecting sheet 9 serves as part of a reflecting section, and is provided so as to be in contact with a back surface 8a of the light guide 8 which faces the light-emitting surface 8b. The reflecting sheet 9 reflects light which travels the light guide 8 so as to cause much more light to be emitted through the light-emitting surface 8b. The reflecting sheet 9 is prepared by, for example, depositing a high-reflectance metal on a resin sheet.

The rotatable surface light source 3 thus includes the reflecting sheet 9, and therefore it becomes difficult that the light transmits the surface light source 3. This makes it harder for a viewer to view anything behind the surface light source 3. By causing such a rotatable surface light source 3 to serve as shielding means, it is possible to achieve a liquid crystal display unit 1 which is more excellent in shielding of the accessories 4.

The following description discusses the optical sheet 10.

The optical sheet 10 uniformizes and converges the light which is emitted through the light-emitting surface 8b of the light guide 8. The optical sheet 10 is provided so as to cover and face almost the entire light-emitting surface 8b. The first liquid crystal display element 2 or the accessories 4 is/are irradiated with the light emitted through the light-emitting surface 8b.

More specifically, the optical sheet 10 can be prepared by appropriately combining and stacking members such as a diffusing plate for diffusing light emitted via the light-emitting surface 8b; a diffusing sheet for converging and scattering light; a lens sheet for converging light so as to increase luminance in a front side direction (i.e., in a normal line direction of the light-emitting surface 8b); and a polarizing and reflecting sheet for increasing luminance of the liquid crystal display device by reflecting one of polarization components of incident light while transmitting the other of the polarization components of the incident light. The combining of those members is preferably determined by taking into consideration an intended price and/or performance of the liquid crystal display device.

Use of such an optical sheet 10 allows a further increase in in-plane uniformity of luminance of the surface light source 3.

The following description discusses the reflecting sheet 11 for the light-emitting element. The reflecting sheet 11 is provided so that it (i) covers the light-emitting element 7 and (ii) surrounds the light-emitting element 7 and an end surface of the light guide 8. Note here that the reflecting sheet 11 is provided so that its inner surface reflects light. This allows the light, which is emitted from the light-emitting element 7, to be efficiently guided toward the light guide 8.

The rotation device 12 is provided to cause the surface light source 3 to rotate, and includes a rotation motor (not illustrated) and a rotation control section (not illustrated) for controlling a rotation of the surface light source 3.
(Accessories)

The following description discusses the accessories 4 provided behind the first liquid crystal display element 2. Note here that the accessories 4 refer to shaped articles, which are to be directly viewed by a viewer of the liquid crystal display unit 1, such as dolls, model characters, or model vehicles. In the present embodiment, dolls are used as the accessories 4.
(Switching of Displays)

Figure 3:
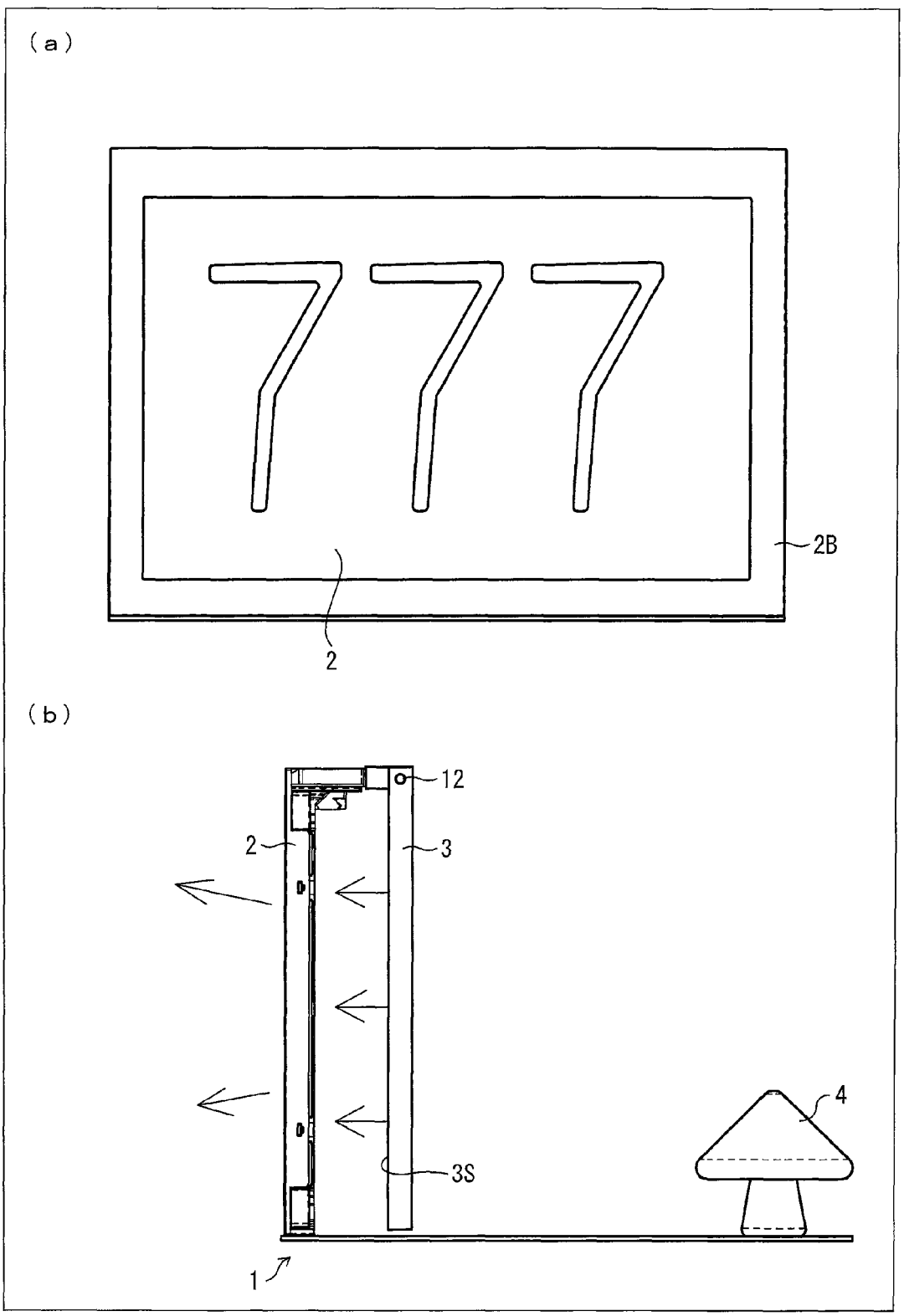
FIG. 3
Figure 4:
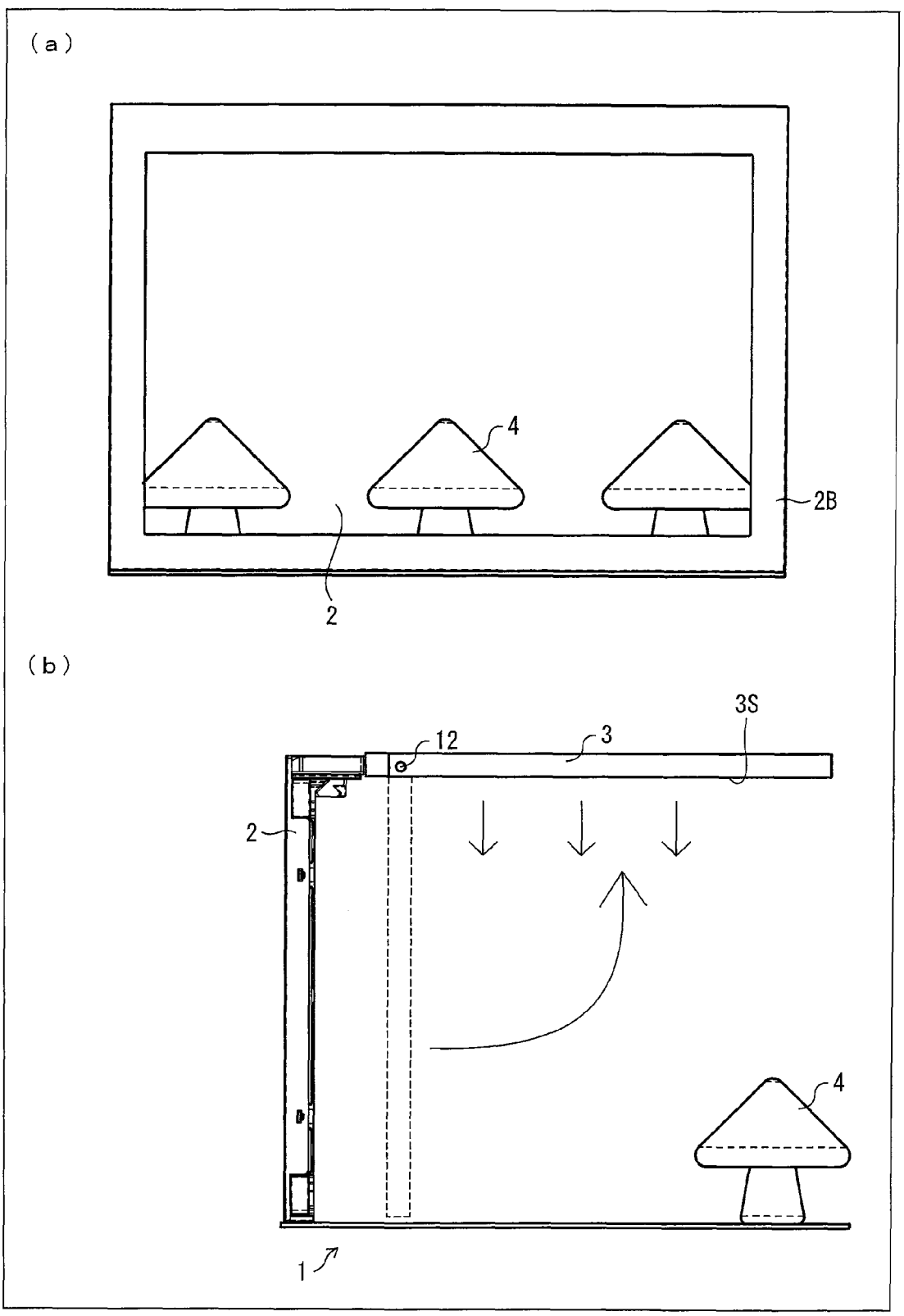
FIG. 4

The following description concretely discusses, with reference to (a) and (b) of FIG. 3 and (a) and (b) of FIG. 4, how the liquid crystal display unit 1 switches, by rotating the surface light surface 3, between (i) displaying of the first liquid crystal display element 2 (i.e., displaying of the image displayed by the first liquid crystal display element 2) and (ii) displaying of the accessories 4.
(Displaying of Image)

The following description first discusses a case where only the image displayed by the first liquid crystal display element 2 is viewed by a viewer of the liquid crystal display unit 1, with reference to (a) and (b) of FIG. 3. (a) of FIG. 3 illustrates how the liquid crystal display unit 1 looks in a case where only the image displayed by the first liquid crystal display element 2 is viewed from a direction in which a primary viewer of the first liquid crystal display element 2 views. (b) of FIG. 3 illustrates how the liquid crystal display unit 1 is schematically configured in a case where (i) it is viewed from a lateral side of the liquid crystal display unit 1 and (ii) only the image displayed on the first liquid crystal display element 2 is viewed.

In the case where only the image displayed by the first liquid crystal display element 2 is viewed by the viewer of the liquid crystal display unit 1, the rotatable surface light source 3 is rotated to so as to be located behind the first liquid crystal display element 2 in substantially parallel with the first liquid crystal display element 2 (see (b) of FIG. 3). In other words, the rotatable surface light source 3 has a light-emitting surface 3S, whose normal line substantially extends in a direction in which a normal line of a display surface of the first liquid crystal display element 2 extends, so as to backlight the first liquid crystal display element 2.

Since the surface light source 3 is located as above, the viewer of the liquid crystal display unit 1 is shielded from viewing the accessories 4 which are provided behind the first liquid crystal display element 2.

This causes the viewer of the liquid crystal display unit 1 to view the image, displayed by the first liquid crystal display element 2, i.e., the image "777" (see (b) of FIG. 3,). During the displaying of the image "777", the surface light source 3 serves as a backlight for the first liquid crystal display element 2.
(Displaying of Accessories)

The following description discusses, with reference to (a) and (b) of FIG. 4, a case where only the accessories 4 are viewed by a viewer of the liquid crystal display unit 1. (a) of FIG. 4 illustrates how the liquid crystal display unit 1 looks in a case where (i) only the accessories 4 are viewed and (ii) the liquid crystal display unit 1 is viewed from a direction in which a primary viewer of the first liquid crystal display element 2 views. (b) of FIG. 4 illustrates how the liquid crystal display unit 1 is schematically configured in a case where (i) it is viewed from a lateral side of the liquid crystal display unit 1 and (ii) only the accessories 4 are viewed.

In the case where only the accessories 4 are viewed by the viewer of the liquid crystal display unit 1, the rotatable surface light source 3 behind the first liquid crystal display element 2 is rotated so as to (i) be located at an upper end part of the first liquid crystal display element 2 and (ii) be substantially perpendicular to the first liquid crystal display element 2 (see (b) of FIG. 4). In other words, the surface light source 3 is located above the accessories 4 that are provided behind the first liquid crystal display element 2, such that a normal line of the light-emitting surface 3S of the surface light source 3 is substantially perpendicular to the normal line of the display surface of the first liquid crystal display element 2.

Since the surface light source 3 is thus located, the viewer of the liquid crystal display unit 1 is not shielded from viewing the accessories 4 which are provided behind the first liquid crystal display element 2.

Note that, in the case where only the accessories 4 are viewed the viewer, the first liquid crystal display element 2 is in a white display state (a state in which the incident light transmits most).

In a case where the surface light source 3 is thus located and the first liquid crystal display element 2 is thus made transparent, it is possible for the viewer of the liquid crystal display unit 1 to view only the accessories 4.

Specifically, as illustrated in (b) of FIG. 4, only the accessories 4 are viewed by the viewer of the liquid crystal display unit 1. Note here that the viewer is hardly aware of the presence of the surface light source 3, because the surface light source 3 is hidden behind a frame (a later-described non-display region 2B) of the first liquid crystal display element 2.

In other words, the surface light source 3 is located behind the non-display region 2B, which is provided in a peripheral part of the first liquid crystal display element 2. Accordingly, the surface light source 3 does not come into sight of the viewer.

In addition, the normal line of the light-emitting surface 3S of the surface light source 3 extends toward the accessories 4. Accordingly, the rotatable surface light source 3, while it is turning on, irradiates the accessories 4 provided behind the first liquid crystal display element 2. This allows the viewer to view the accessories 4 more clearly.

As is clear from above, according to the liquid crystal display unit 1 of the present embodiment, the rotatable surface light source 3 has the below-described first through third functions. The first function—the rotatable surface light source 3 serves as means for shielding the viewer of the liquid crystal display unit 1 from viewing the accessories 4 (that is, means for causing the accessories 4 not to be visible to the viewer of the liquid crystal display unit 1). The second function—the rotatable surface light source 3 serves as the backlight for the first liquid crystal display element 2. The third function—the rotatable surface light source 3 serves as means for irradiating the accessories 4 with light.
(First Liquid Crystal Display Element)

Figure 5:
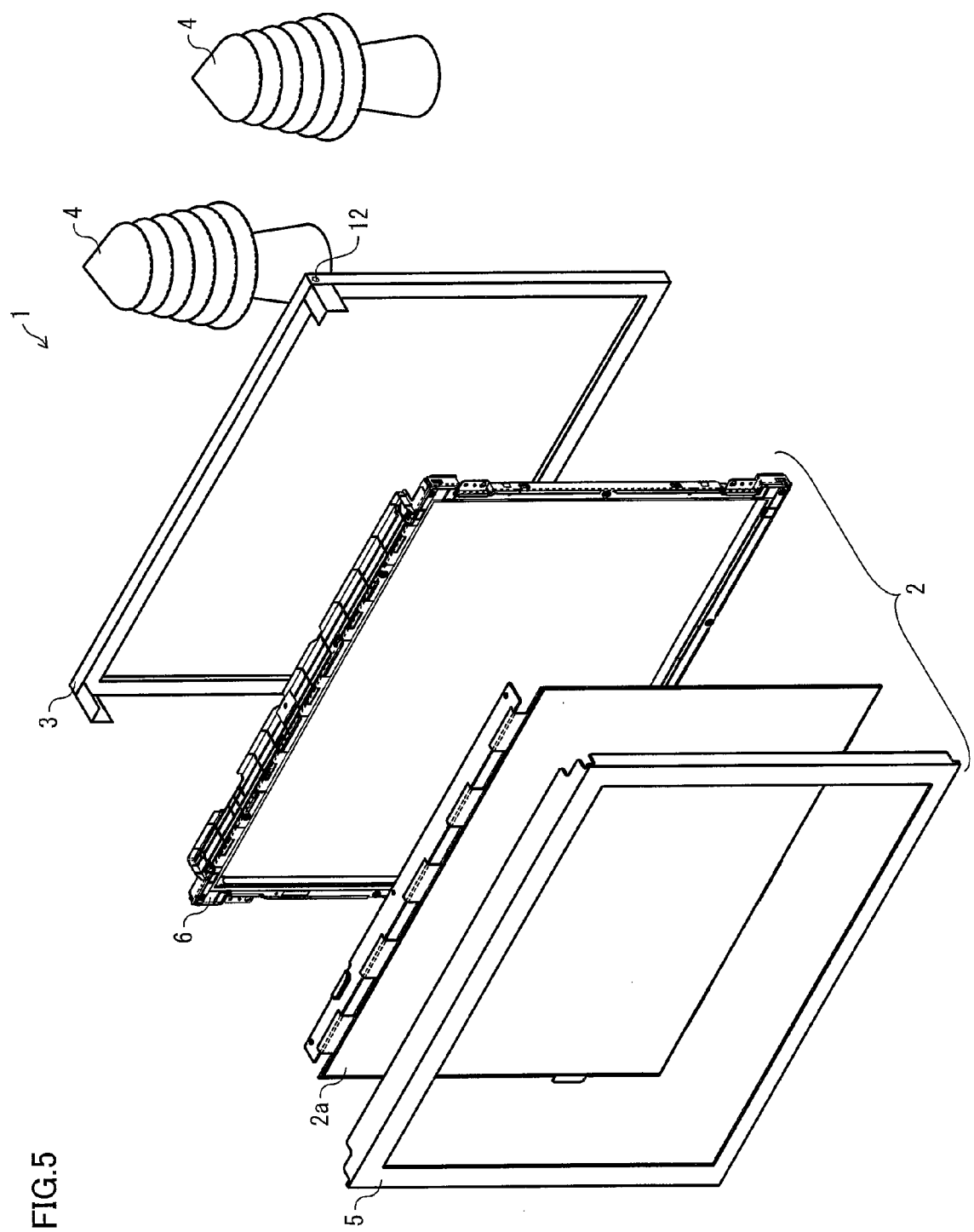
FIG. 5

The following description discusses the first liquid crystal display unit 1 in more detail, with reference to FIG. 5. FIG. 5 is a perspective view schematically illustrating how a liquid crystal display unit in accordance with an embodiment of the present invention is configured.

As illustrated in FIG. 5, the first liquid crystal display element 2 of the present embodiment includes a liquid crystal panel 2a, a metal frame 5, and a plastic frame 6. Specifically, the first liquid crystal display element 2 is configured such that the liquid crystal panel 2a is sandwiched between the metal frame 5 and the plastic frame 6. The metal frame 5 and the plastic frame 6 constitute the foregoing non-display region 2B of the first liquid crystal display element 2.

The metal frame 5 and the plastic frame 6 have a function of protecting the first liquid crystal display element 2 against external impact etc. Specifically, the metal frame 5 and the plastic frame 6 are preferably provided in the liquid crystal display unit 1 particularly, in a case where the liquid crystal display unit 1 is installed into a gaming device etc. such that the liquid crystal display unit 1 is frequently exposed to external impact etc.

Further, according to the present embodiment, the metal frame 5 and the plastic frame 6 not only have a function of protecting the first liquid crystal display element 2, but also have a function of connecting, to which the rotation device 12 also contributes, the first liquid crystal display element 2 and the rotatable surface light source 3.

That is, the metal frame 5 and the surface light source 3 are connected with each other to form the liquid crystal display unit 1.

Note here that the first liquid crystal display element 2 and the surface light source 3 can be connected to each other with use of a member(s) other than the metal frame 5 and the plastic frame 6.

(Control of Rotation)

Figure 6:
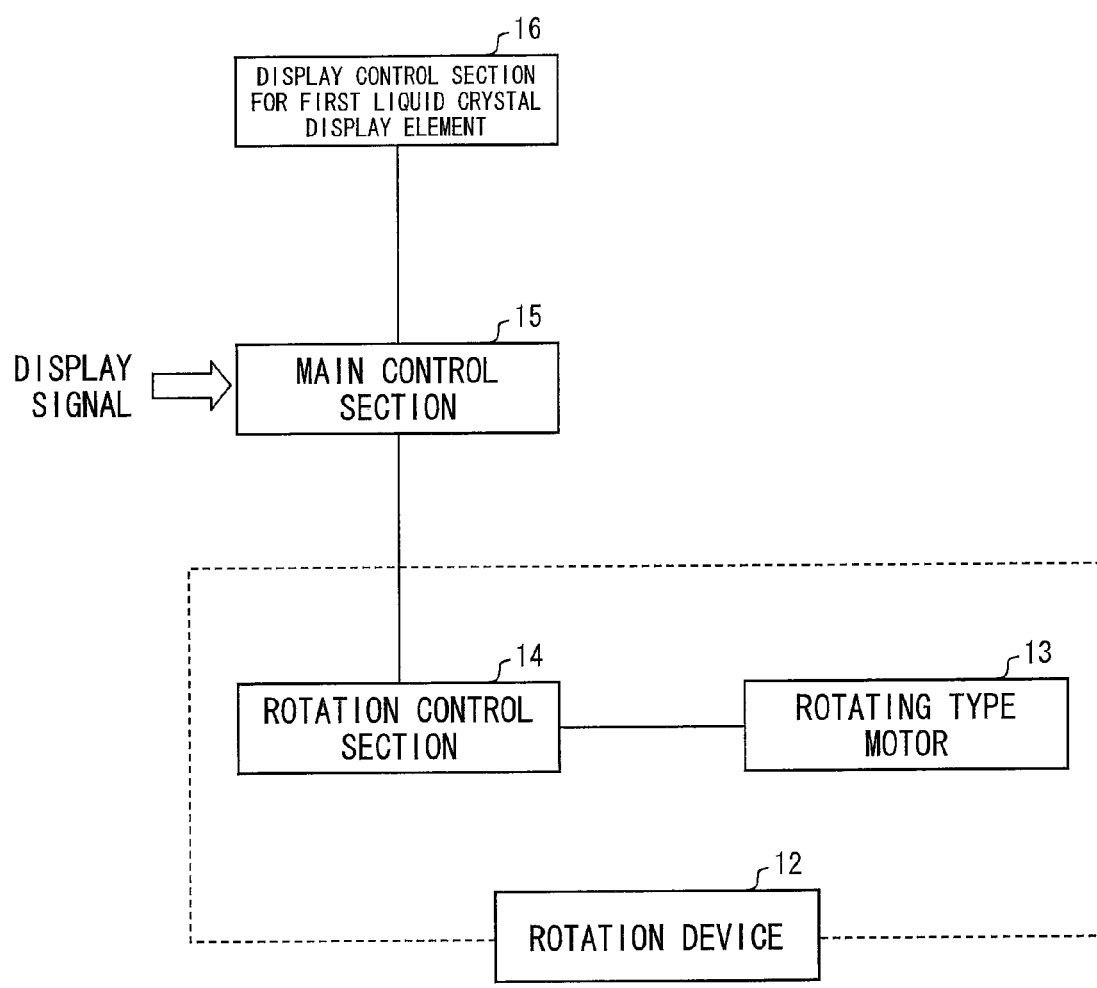
FIG. 6

The following description discusses, with reference to FIG. 6, rotation control of the surface light source 3 of the present embodiment.

FIG. 6 is a block diagram schematically illustrating how a control system of the liquid crystal display unit 1 is configured in the present embodiment.

(Configuration of Control System)

As illustrated in FIG. 6, according to the control system, a main control section 15 receives a display signal. The main control section 15 is connected with (i) a display control section 16 for the first liquid crystal display element and (ii) the rotation device 12. The rotation device 12 includes (a) a rotation control section 14 directly connected with the main control section 15 and (b) a rotation motor 13 connected with the rotation control section 14.

That is, the rotation device 12 of the surface light source 3 of the present embodiment includes (i) the rotation motor 13 for rotating the surface light source 3 and (ii) the rotation control section 14 for controlling the rotation of the surface light source 3.

(Control Example)

The following description discusses an example of control carried out by the control system.

The main control section 15 controls, in accordance with a received display signal, (i) the display control section 16 for the first liquid crystal display element and (ii) the rotation control section 14 of the rotation device 12. Then, the rotation control section 14 controls the rotation motor 13 to rotate. The rotation motor 13 is connected to the rotatable surface light source 3, and thus the rotatable surface light source 3 is rotated by the rotation of the rotation motor 13.

More specifically, for example in a case where the display signal indicates that only the image displayed by the first liquid crystal display element 2 is to be viewed, the main control section 15 controls the rotation control section 14 to drive the rotation motor 13. This causes the rotatable surface light source 3 to rotate and be located so that the rotatable surface light source 3 backlights the first liquid crystal display element 2. Concurrently, the main control section 15 controls the display control section 16 so as to cause the first liquid crystal display element 2 to display the image.

In contrast, in a case where the display signal indicates that only the accessories 4 are to be viewed, the main control section 15 controls the rotation control section 14 to drive the rotation motor 13. This causes the rotatable surface light source 3 to rotate and irradiate the accessories 4 with light. Concurrently, the main control section 15 controls the display control section 16 so as to cause the first liquid crystal display element 2 to have a white display state (a state in which the incident light transmits most).

(Shielding of Accessories)

As described above, the main control section 15 controls, in accordance with the received display signal, the rotation control section 14 to drive the rotation motor 13. This causes the rotatable surface light source 3 to be rotated to a required location. Specifically, in a case where the accessories 4 need to be shielded from being viewed, the rotatable surface light source 3 is rotated so as to backlight the first liquid crystal display element. This causes the viewer to be shielded from viewing the accessories 4.

That is, according to the liquid crystal display unit 1 of the present embodiment, the location of the rotatable surface light source 3 is changed in accordance with a received display signal. Accordingly, it is possible to easily control switching between a state in which the accessories 4 are shielded and a state in which the accessories 4 are not shielded.

In contrast, according to a conventional liquid crystal display unit, an accessory provided behind a liquid crystal display element is shielded with use of for example a polymer-dispersed liquid crystal display element. In other words, since the incident light is scattered when no voltage is applied, the polymer-dispersed liquid crystal display element becomes clouded. The clouded polymer-dispersed liquid crystal display element serves as a shutter, thereby allowing the accessory provided behind the polymer-dispersed liquid crystal display element to be shielded.

According to the above method, however, the polymer-dispersed liquid crystal display element becomes clouded by the scattering of the incident light. This causes a contour of the accessory to look blurry and color to be unclear. In that situation, the accessory is still dimly recognizable.

In contrast, according to the liquid crystal display unit 1 of the present embodiment, the rotatable surface light source 3 itself is used as shielding means. Furthermore, it is difficult that the light transmits the surface light source 3. This makes it hard for a viewer to view anything behind the surface light source 3.

Since the rotatable surface light source 3 is used as the shielding means, it is possible to achieve a liquid crystal display unit 1 and a control method for a liquid crystal display unit 1 which are excellent in shielding of the accessories 4.

(Light Use Efficiency)

The following description discusses light use efficiency and luminance uniformity.

A conventional liquid crystal display unit included two light sources, i.e., (i) a light source serving as a backlight for irradiating a liquid crystal display element on which an image is displayed and (ii) a light source for irradiating accessories. Therefore, the conventional liquid crystal display unit caused a problem that it included two separate light sources and thus use efficiency of the light sources was low.

In contrast, a light source included in the liquid crystal display unit 1 of the present embodiment is only the rotatable surface light source 3. This causes the rotatable surface light source 3 to be rotated (i) so as to irradiate the accessories 4 with light in a case where only the accessories 4 are viewed by the viewer of the liquid crystal display unit 1, whereas (ii) so as to backlight the first liquid crystal display element 2 in a case where the viewer of the liquid crystal display unit 1 is shielded from viewing the accessories 4 so that the image displayed by the first liquid crystal display element 2 is viewed by the viewer. Accordingly, the liquid crystal display unit 1 is configured to necessitate a single light source. This allows an improvement in the use efficiency of the light source.

(In-Plane Uniformity)

Further, according to a conventional art, a polymer-dispersed liquid crystal display element was put into a light-scattering state, and then served as both a light guide plate and a diffusing plate. That is, a surface light source was prepared by making use of a light-scattering characteristic of the polymer-dispersed liquid crystal display element. This caused a problem that in-plane uniformity of luminance was not excellent.

In contrast, the liquid crystal display unit 1 of the present embodiment includes the surface light source 3. This makes it possible to achieve illumination having high in-plane uniformity of luminance, particularly in a case where the surface light source 3 includes the light guide 8. As such, it is possible for the viewer to view the uniformly-illuminated image displayed by the first liquid crystal display element 2 and the uniformly-illuminated accessories 4.

As is clear from above, according to the configuration of the present embodiment, it is possible to provide a liquid crystal display unit 1 and a control method for the liquid crystal display unit 1, each of which achieves (i) sufficient shielding of the accessories 4 provided behind the first liquid crystal display element 2, (ii) high in-plane uniformity of luminance, and (iii) high use efficiency of a light-emitting element.

Embodiment 2

The following description discusses a second embodiment of the present invention. Note here that configurations other than a configuration described in the present embodiment are same as those described in Embodiment 1. For convenience of description, members having functions identical to those illustrated in the drawings of Embodiment 1 are assigned identical referential numerals, and their descriptions are omitted here.

A liquid crystal display unit 1a of the present embodiment includes a liquid crystal display unit 1 of Embodiment 1 and a second liquid crystal display element 17. The second liquid crystal display element 17 has a shutter function, and a polymer-dispersed liquid crystal display element is suitably used as the second liquid crystal display element 17. The following description discusses the second embodiment by exemplifying a configuration in which a polymer-dispersed liquid crystal display element is used as the second liquid crystal display element 17.

(Outline of Configuration)

Figure 7:
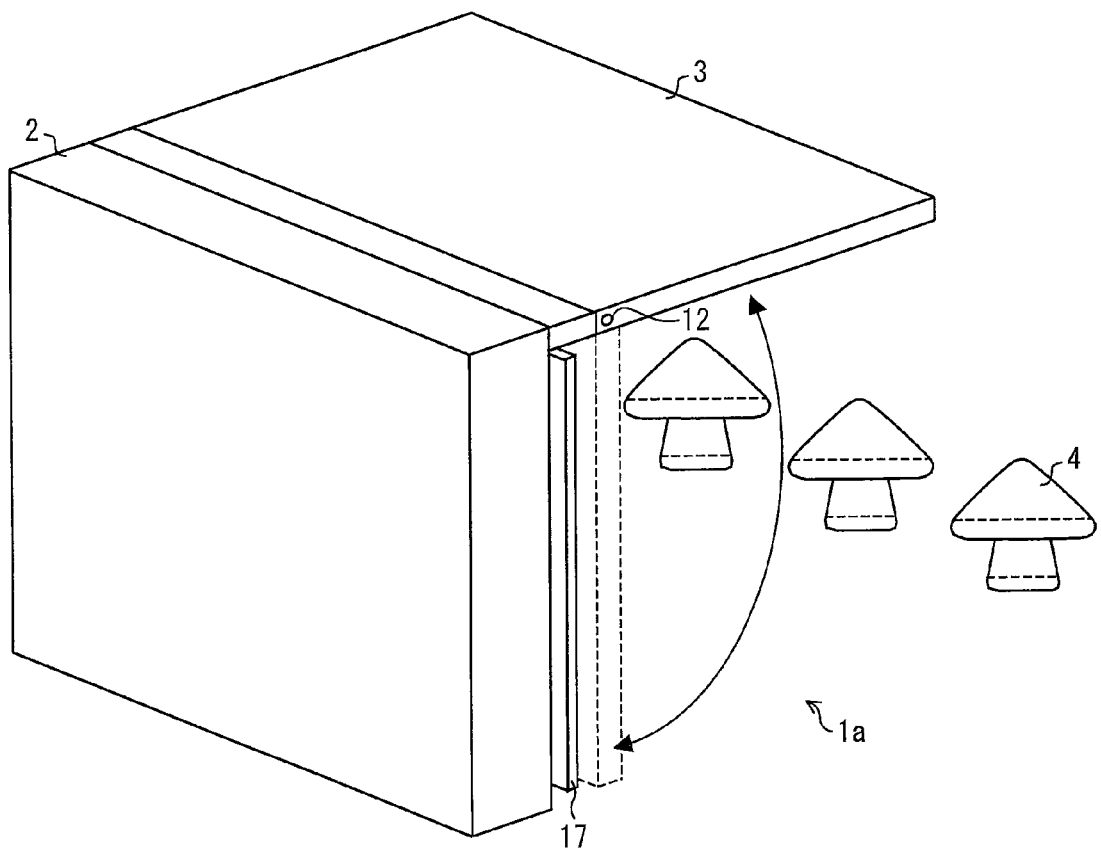
FIG. 7

FIG. 7 is a perspective view schematically illustrating how the liquid crystal display unit 1a in accordance with the second embodiment of the present invention is configured.

The liquid crystal display unit 1a of the present embodiment includes a first liquid crystal display element 2, accessories 4, a surface light source 3, and the second liquid crystal display element 17. The accessories 4 are provided behind the first liquid crystal display element 2, and the surface light source 3 is provided between the first liquid crystal display element 2 and the accessories 4. The second liquid crystal display element 17 is provided between the liquid crystal display element 2 and the surface light source 3.

That is, the liquid crystal display unit 1a is different from the liquid crystal display unit 1 of Embodiment 1 in that a polymer-dispersed liquid crystal display element, which is used as the second liquid crystal display element 17, is further provided between the first liquid crystal display element 2 and the surface light source 3.

(Function of Second Liquid Crystal Display Element)

The following description discusses a function of the second liquid crystal display element 17 of the present embodiment.

According to the liquid crystal display unit 1a of the present embodiment, the surface light source 3 rotates, in a manner similar to the liquid crystal display unit 1a of Embodiment 1, so as to switch between (i) displaying of only the image displayed by the first liquid crystal display element 2 and (ii) displaying of only the accessories 4.

Unlike Embodiment 1, according to the present embodiment, the second liquid crystal display element 17, which has a shutter function, causes a viewer of the liquid crystal display unit 1a not to view the rotation of the surface light source 3.

Specifically, the second liquid crystal display element 17 is caused to set its shutter function on while the surface light source 3 is rotating. More specifically, the polymer-dispersed liquid crystal display element is caused to scatter light while the surface light source 3 is rotating. This allows the viewer of the liquid crystal display unit 1a not to view the rotation of the surface light source 3.

Further, for example in a case where (i) a state in which only the image displayed by the first liquid crystal display element 2 is viewed is switched to (ii) a state in which only the accessories 4 are viewed, it is possible for the viewer to view the accessories 4 without any advance notice (without see-through accessories or without seeing part of the accessories), by causing the second liquid crystal display element 17 to change the shutter function from on into off, that is, by causing the polymer-dispersed liquid crystal display element to be made transparent, after the rotation of the surface light source 3 is stopped. As such, it is possible to provide a more exciting performance.

Furthermore, in a case where the viewer of the liquid crystal display unit 1a is shielded from viewing the accessories 4 so that only the image displayed by the first liquid crystal display element is viewed (in other words, in a case where the surface light source 3 is rotated to backlight the first liquid crystal display element 2), it is possible to improve the in-plane uniformity of luminance of light emitted from the surface light source 3, by causing the polymer-dispersed liquid crystal display element (i.e., the second liquid crystal display element 17) to be in a light-scattering state and by making use of the light-scattering state. This allows the viewer to view a higher-quality image displayed by the first liquid crystal display element 2.

The following description discusses more specifically with reference to the drawings.

(Displaying of Image)

The following description first discusses a case where only the image displayed by the first liquid crystal display element 2 is viewed by the viewer of the liquid crystal display unit 1a.

Figure 8:
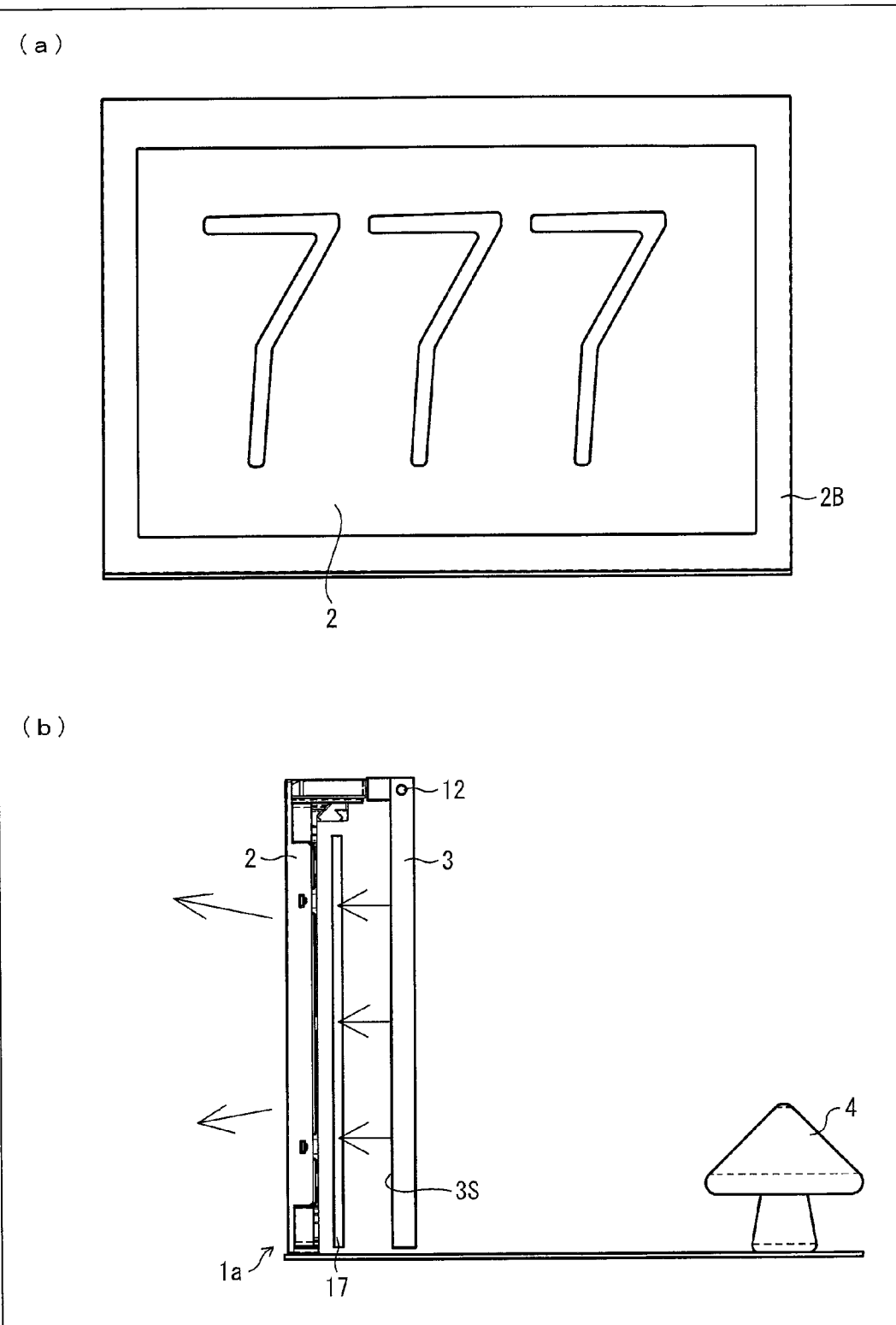
FIG. 8

(a) of FIG. 8 illustrates how the liquid crystal display unit 1a looks in a case where (i) only an image is viewed and (ii) the liquid crystal display unit 1a is viewed from a direction in which a primary viewer of the first liquid crystal display element 2 views. (b) of FIG. 8 illustrates how the liquid crystal display unit 1a looks in a case where it is viewed from a lateral side of the liquid crystal display unit 1a.

In the case where only the image displayed by the first liquid crystal display element 2 is viewed by the viewer, the first liquid crystal display element 2 is in a displaying state and is displaying an image (e.g., "777" as illustrated in (a) of FIG. 8) to be viewed by the viewer. Meanwhile, the rotatable surface light source 3 is rotated so as to be located behind the first liquid crystal display element 2 in substantially parallel with the first liquid crystal display element 2, so as to backlight the first liquid crystal display element 2 (see (b) of FIG. 8).

Note here that, according to the present embodiment, the polymer-dispersed liquid crystal display element (i.e., the second liquid crystal display element 17) is in the light-scattering state. This makes it possible to more completely shield, from the viewer, the accessories 4 provided behind the second liquid crystal display element 17.

As described above, the polymer-dispersed liquid crystal display element (i.e., the second liquid crystal display element 17) is in the light-scattering state. Therefore, it is further possible to make more uniform the light emitted from the surface light source 3.

(Displaying of Accessories)

Next, the following description discusses a case where only the accessories 4 are viewed by the viewer of the liquid crystal display unit 1a.

Figure 9:
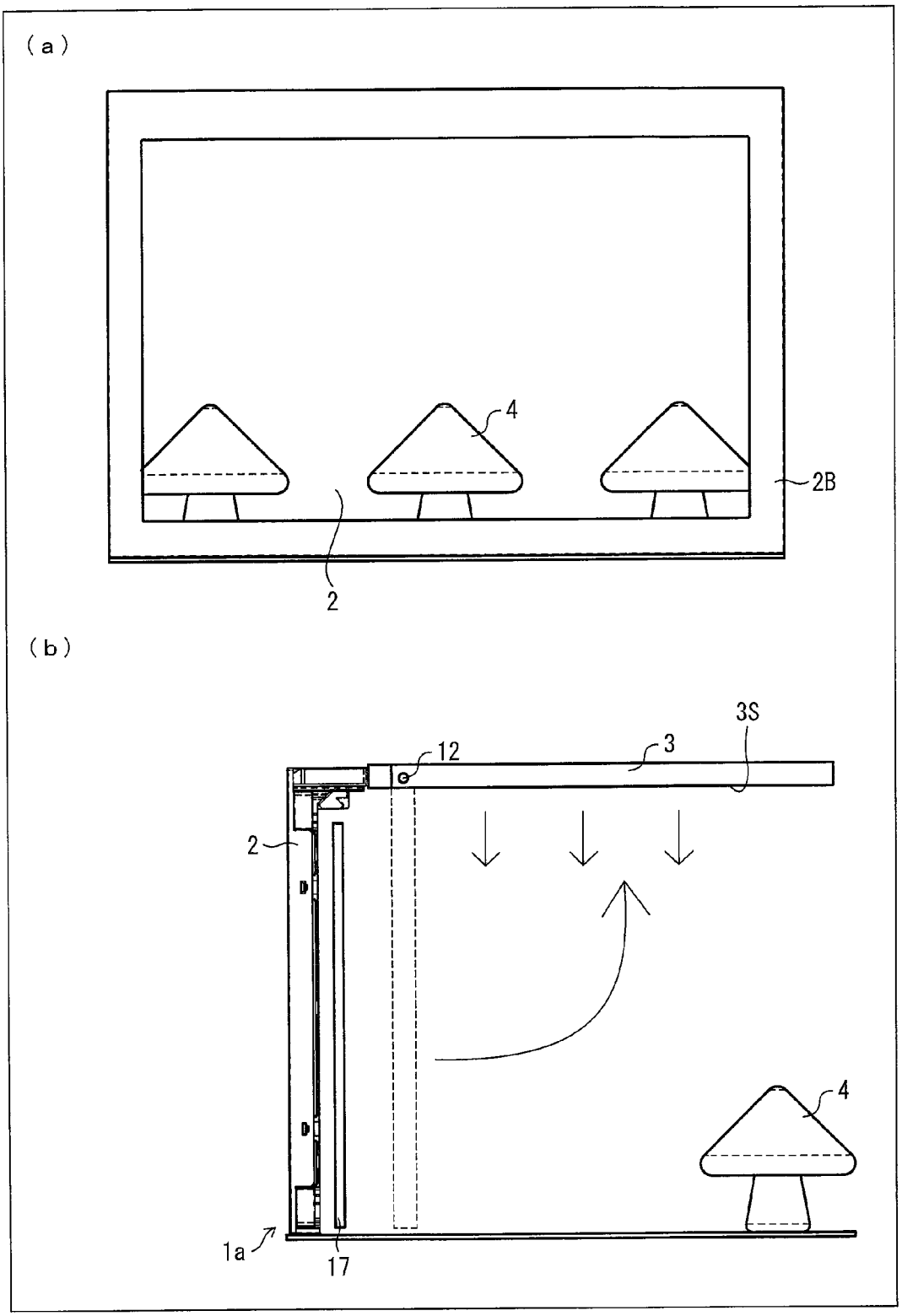
FIG. 9

(a) of FIG. 9 illustrates how the liquid crystal display unit 1a looks in a case where (i) only the accessories 4 are viewed and (ii) the liquid crystal display unit 1a is viewed from a direction in which a primary viewer of the first liquid crystal display element 2 views. (b) of FIG. 9 illustrates how the liquid crystal display unit 1a is schematically configured in a case where it is viewed from a lateral side of the liquid crystal display unit 1a.

In the case where only the accessories 4 are viewed by the viewer as illustrated in (b) of FIG. 9, (i) the first liquid crystal display element 2 is put into a white display state (i.e., a state in which the incident light transmits most) and (ii) the polymer-dispersed liquid crystal display element (i.e., the second liquid crystal display element 17) is put into a light-transmitting state.

Accordingly, it is possible for the viewer of the liquid crystal display unit 1a to view, without being shielded by the first liquid crystal display element 2 and the second liquid crystal display element 17, the accessories 4 provided behind the second liquid crystal element 17.

In the case where the accessories 4 are viewed, the rotatable surface light source 3 is located above the accessories 4 so as to be perpendicular to the first liquid crystal display element 2, in the manner similar to Embodiment 1. Accordingly, the surface light source 3 does not stand in the way when the viewer views the accessories 4. Rather, the surface light source 3 irradiates the accessories 4 with light. As such, it is possible for the viewer to view the accessories 4 more clearly.

Since the liquid crystal display unit 1a of the present embodiment includes the second liquid crystal display element 17, it is possible for a viewer not to view the rotation of the surface light source 3, by making use of the light-scattering state of the second liquid crystal display element 17. It is further possible to more completely shield the accessories 4 from the viewer.

Further, in the case where the image displayed by the first liquid crystal display element 2 is viewed, the second liquid crystal display element 17, which is in the light-scattering state, serves as a diffusing plate. This allows an improvement in in-plane uniformity of luminance of the image displayed by the first liquid crystal display element 2.

(Configuration of Control System)

The following description discusses how (i) the rotation of the surface light source 3 and (ii) the second liquid crystal display element 17 are controlled in the liquid crystal display unit 1a of the present embodiment.

Figure 10:
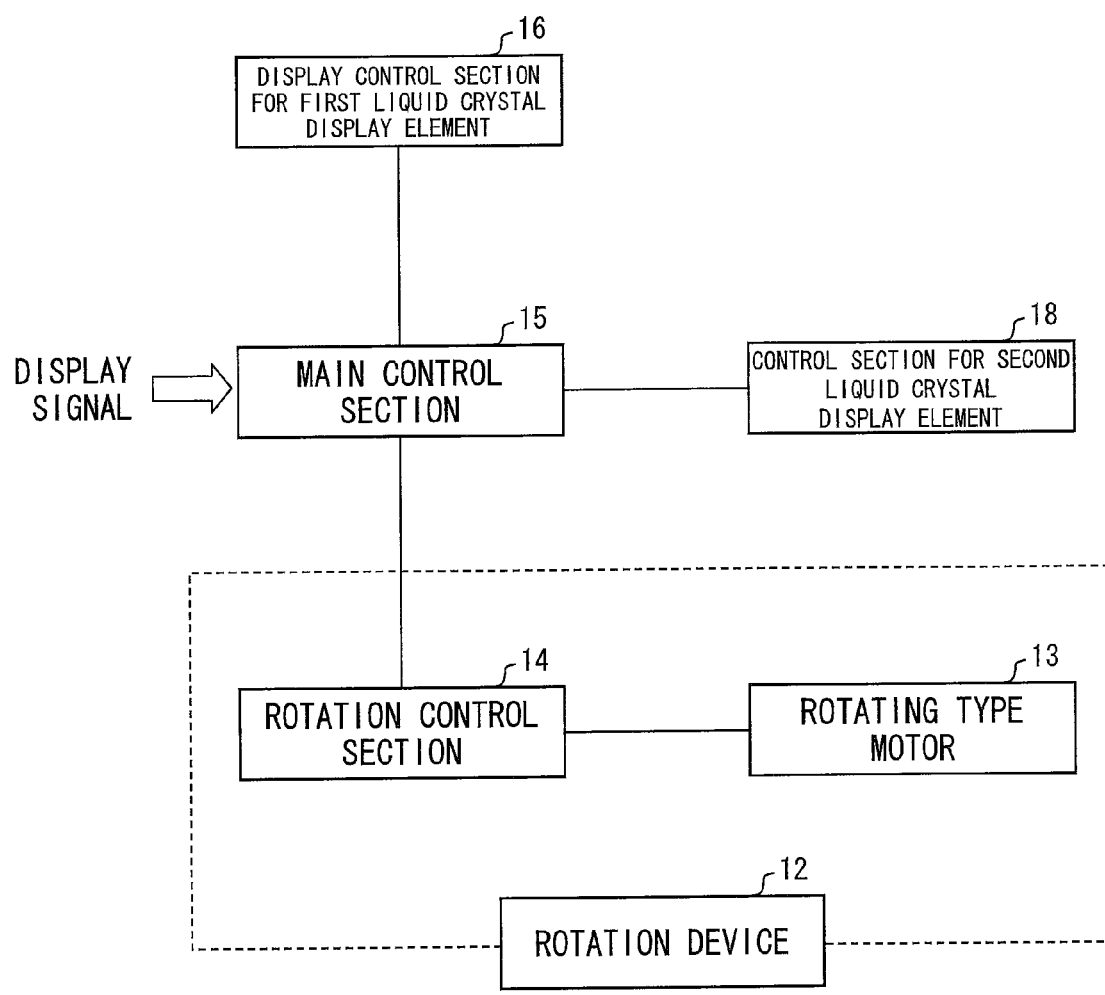
FIG. 10

FIG. 10 is a block diagram illustrating a control system of the liquid crystal display unit of the present embodiment.

As illustrated in FIG. 10, the control system of the present embodiment differs from the control system of Embodiment 1 shown in FIG. 6 in that it further includes a control section 18 for the second liquid crystal display element 17, which control section 18 is connected with the main control section 15.

(Control Example)

The following description discusses an example of how the control is carried out in the control system. Unlike the main control section 15 of Embodiment 1, the main control section 15 of the present embodiment further controls, in accordance with a display signal supplied to the main control section 15, the control section 18 for the second liquid crystal display element.

Specifically, for example, while the rotatable surface light source 3 is rotating, under the control of the rotation control section 14, in response to the display signal thus supplied, the control section 18 controls the second liquid crystal display element 17 so as to set the shutter function on. More specifically, in a case where the second liquid crystal display element 17 is a polymer-dispersed liquid crystal display element as above, the polymer-dispersed liquid crystal display element is caused to be in the light-scattering state.

In a case where the display signal supplied to the main control section 15 indicates that only the image displayed by the first liquid crystal display element 2 is to be viewed, the main control section 15 controls, in the manner similar to Embodiment 1, the rotation control section 14 to drive the rotation motor 13. This causes the rotatable surface light source 3 to rotate and be located so that the rotatable surface light source 3 backlights the first liquid crystal display element 2. Concurrently, the main control section 15 controls the display control section 16 so as to cause the first liquid crystal display element 2 to display the image.

In addition, according to the present embodiment, the main control section 15 further controls the control section 18 to set on the shutter function of the second liquid crystal display element 17.

In contrast, in a case where the display signal indicates that only the accessories 4 are to be viewed, the main control section 15 controls the rotation control section 14 to drive the rotation motor 13. This causes the rotatable surface light source 3 to rotate and irradiate the accessories 4 with light. Concurrently, the main control section 15 controls the display control section 16 so as to cause the first liquid crystal display element 2 to have a white display state (a state in which the incident light transmits most).

In addition, according to the present embodiment, the main control section 15 further controls the control section 18 to set off the shutter function of the second liquid crystal display element 17. Specifically, in the case where the second liquid crystal display element 17 is a polymer-dispersed liquid crystal display element as above, the polymer-dispersed liquid crystal display element is caused to be in the light-transmitting state.

That is, in the case where the second liquid crystal display element 17 is the polymer-dispersed liquid crystal display element, the polymer-dispersed liquid crystal display element is caused to be in the light-scattering state (i) while the rotatable surface light source 3 is rotating and (ii) in the case where only the image displayed by the first liquid crystal display element 2 is to be viewed.

On the other hand, the polymer-dispersed liquid crystal display element is caused to be in the light-transmitting state in the case where only the accessories 4 are to be viewed.

The above control makes it possible for the viewer not to view the accessories 4 and the rotation of the surface light source, by making use of the fact that the shutter function of the second liquid crystal display element 17 is set on.

Further, since the light, emitted by the surface light source 3, does not leak backward, it is possible for the first liquid crystal display element 2 to display a brighter image.

Furthermore, in the case where the second liquid crystal display element 17 is a polymer-dispersed liquid crystal display element, the polymer-dispersed liquid crystal display element, which is in the light-scattering state (i.e., a state in which the shutter function is set on), can function as a diffusing plate. Accordingly, it is possible to further improve in-plane uniformity of luminance of the image displayed by the first liquid crystal display element 2.

Note here that the second liquid crystal display element 17 used in the present embodiment is not limited to the polymer-dispersed liquid crystal display element, and therefore a polymer-dispersed film can be used as the second liquid crystal display element 17. Note here that the polymer-dispersed film indicates a configuration in which polymer-dispersed liquid crystal is sandwiched between films.

Embodiment 3

The following description discusses a third embodiment of the present invention. Note here that configurations other than a configuration described in the present embodiment are same as those described in Embodiments 1 and 2.

For convenience of description, members having functions identical to those illustrated in the drawings of Embodiments 1 and 2 are assigned identical referential numerals, and their descriptions are omitted here.

A liquid crystal display unit of the present embodiment has the same configuration, in which the surface light source is rotatably provided, as those of Embodiments 1 and 2. Note, however, that the surface light source of the present embodiment differs from Embodiments 1 and 2 in that it is divided, on a light-emitting surface, into regions each of which is independently rotatable. This will be described below with reference to (a) and (b) of FIG. 11.

Figure 11:
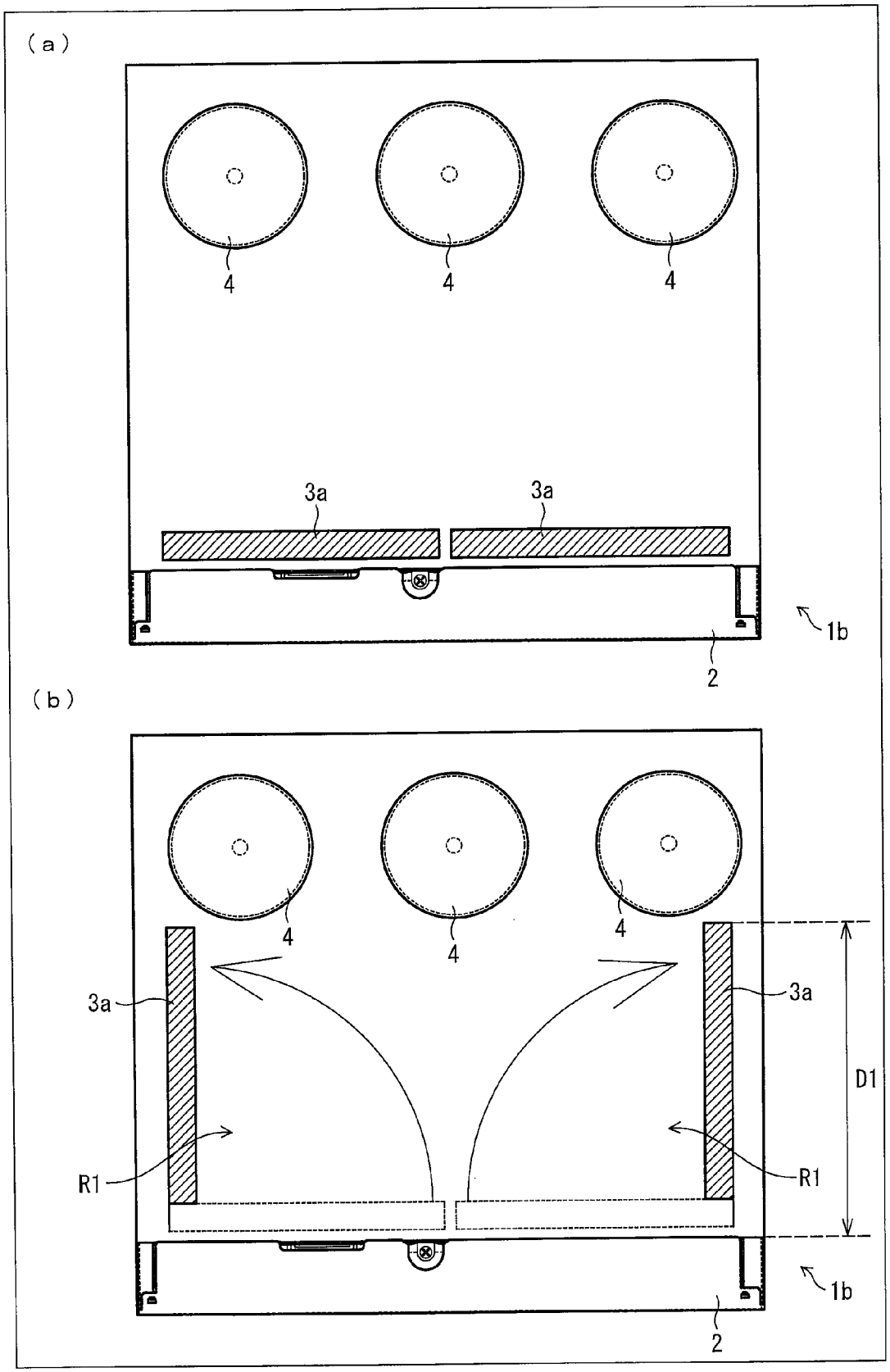
FIG. 11

(a) and (b) of FIG. 11 are top views, each of which illustrates how a liquid crystal display unit 1*b* of Embodiment 3 in accordance with the present invention is schematically configured. (a) of FIG. 11 illustrates the liquid crystal display unit 1*b* in which a surface light source 3*a* is closed. (b) of FIG. 11 illustrates the liquid crystal display unit 1*b* in which the surface light source 3*a* is open.

As illustrated in (a) of FIG. 11, the liquid crystal display unit 1*b* of the present embodiment includes a first liquid crystal display element 2, the surface light source 3*a*, and accessories 4. Unlike the surface light source 3 of Embodiment 1 illustrated in FIG. 1, the surface light source 3*a* is divided into two regions on the light-emitting surface. Specifically, the surface light source 3*a* has a shape which is obtained (i) when the surface light source 3 of Embodiment 1 is divided into two regions each of which has a substantially identical area size and which are adjacent to each other in a horizontal direction and (ii) when it is seen from the viewer. In other words, in a case where the first liquid crystal display element 2, having a rectangular shape, is provided so as to have a width (i.e., horizontal line) greater than its height (i.e., vertical line) when it is seen from the viewer, the surface light source 3 is divided, by a line which is substantially parallel with the vertical line of the rectangular shape and is in a substantial center of the horizontal line of the rectangular shape, into two regions each having a substantially identical area size.

Then, as illustrated in (b) of FIG. 11, the surface light source 3*a*, which is divided into the two regions which are adjacent to each other in the horizontal direction, is rotated as if it were double doors being opened.

The surface light source 3 of Embodiment 1 rotates on its upper side so as to open upward and close downward. In contrast, the surface light source 3*a* of the present embodiment rotates such that each of the two regions (i.e., the divided surface light source 3*a*) rotates independently on a corresponding one of left and right sides of the surface light source 3*a*.

In other words, each of the two regions (i.e., the divided surface light source 3*a*) rotates independently on a corresponding one of sides which are respective left and right vertical lines (i.e., short sides of the rectangular shape which face a borderline by which the surface light source 3*a* is divided) of the rectangular-shaped first liquid crystal display element 2.

According to the liquid crystal display unit 1*b* of the present embodiment, the rotatable surface light source 3*a* is divided into the regions. This allows a reduction in space (i.e., regions R1 in (b) of FIG. 11) which is required for the rotatable surface light source 3*a* to rotate.

According to the liquid crystal display unit 1*b* of the present embodiment, it is also possible to reduce a distance (represented as the distance D1 of (b) of FIG. 11) which lies behind the first liquid crystal display element 2, within which distance the accessories 4 cannot be provided because the surface light source 3*a* should rotate within the distance.

Furthermore, according to the liquid crystal display unit 1*b* of the present embodiment, it is further possible to provide larger accessories 4 in an identical space, as compared with the liquid crystal display unit 1 of FIG. 1 in which the surface light source 3 rotates so as to open upward. Note here that the larger accessories 4 are larger in height, in the case where the surface light source 3*a* is divided into the two regions adjacent to each other in the horizontal direction.

The above description dealt with the example in which the surface light source is divided into the regions adjacent to each other in the horizontal direction. Note, however, that how the surface light source is divided is not limited to the above example. For example, the surface light source can be divided into regions adjacent to each other in a vertical direction or in a diagonal direction, each of which regions is independently rotatable.

Further, the above description discussed, as an example, the liquid crystal display unit 1*b* including the first liquid crystal display element 2, the surface light source 3*a*, and the accessories 4.

Note, however, that the configuration of the liquid crystal display unit 1*b* of the present embodiment is not limited to the configuration described in such an example. For example, as described in Embodiment 2, the liquid crystal display unit 1*b* can have a configuration in which a second liquid crystal display element 17, having a shutter function, is further provided between the liquid crystal display element 2 and the surface light source 3*a*. In such a configuration, for example, a polymer-dispersed liquid crystal display element can be used as the second liquid crystal display element 17, as described earlier.

According to the configuration in which the second liquid crystal display element 17 is further provided, it is possible for a viewer not to view the rotation of the surface light source 3*a* by setting on, in the manner similar to Embodiment 2, the shutter function of the second liquid crystal display element 17 while the surface light source 3*a* is rotating. It is further possible to more completely shield the accessories 4 from the viewer by setting on the shutter function.

Moreover, particularly in the case where the second liquid crystal display element 17 is realized by the polymer-dispersed liquid crystal display element, it is possible to improve the in-plane uniformity of luminance of the image displayed by the first liquid crystal display element, by making use of the light-scattering state of the polymer-dispersed liquid crystal display element.

(Gaming Device)

Figure 12:
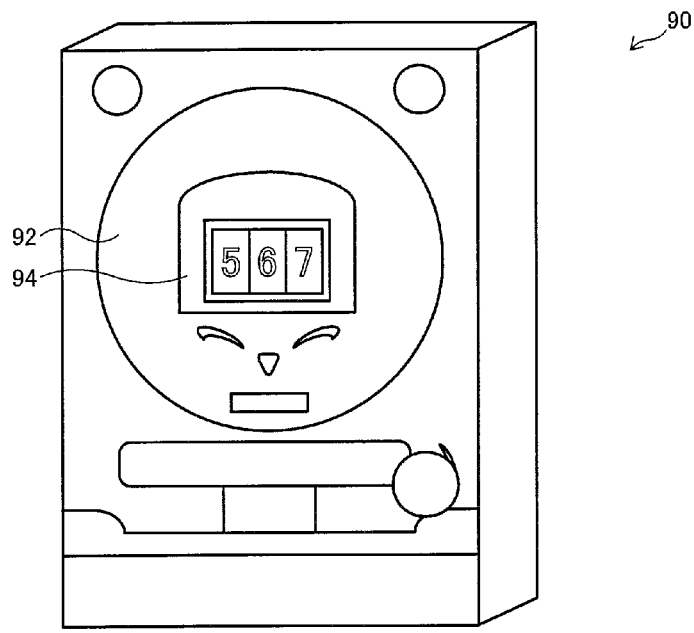
FIG. 12
Figure 13:
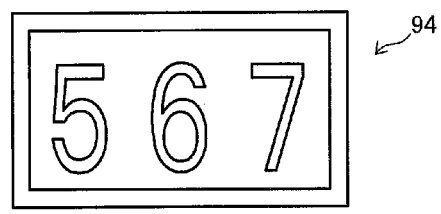
FIG. 13
Figure 13:
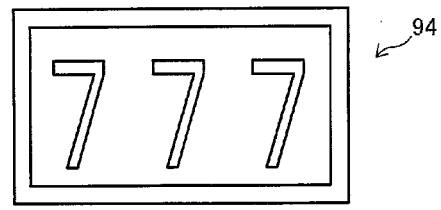
Figure 13:
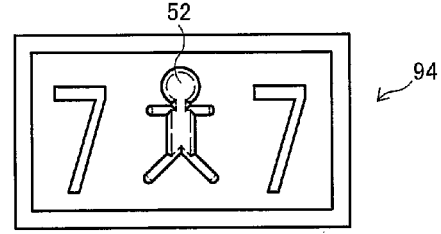
Figure 14:
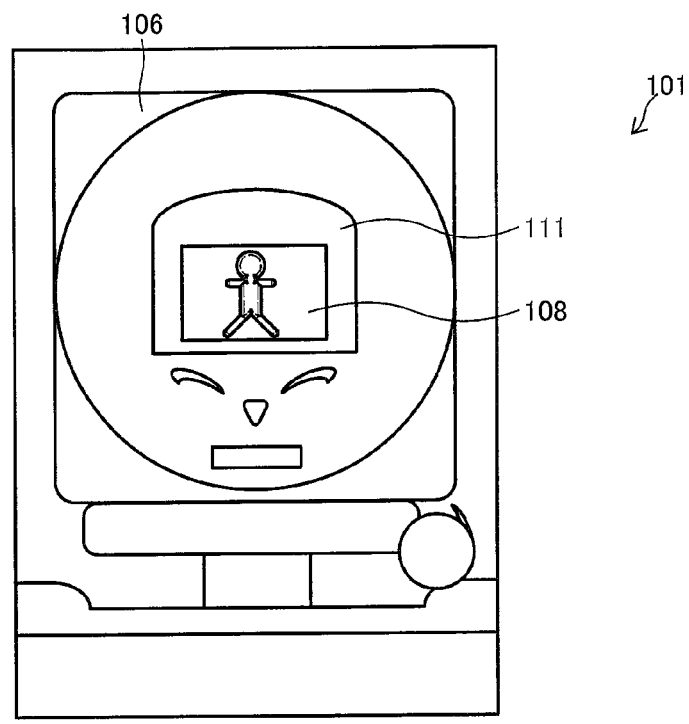
FIG. 14
Figure 15:
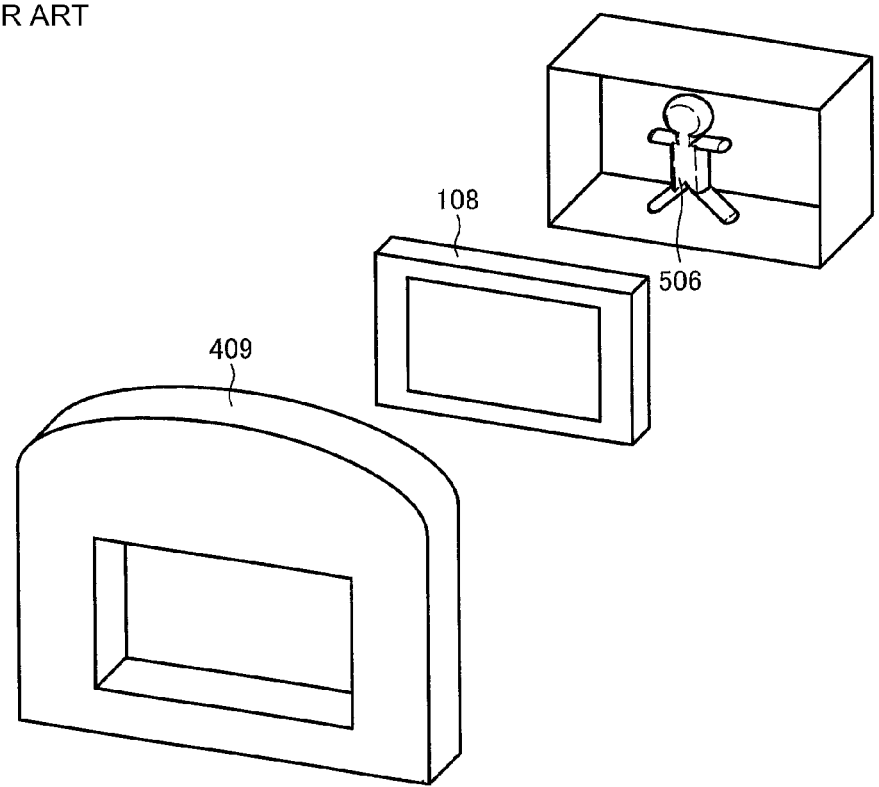
FIG. 15
Figure 16:
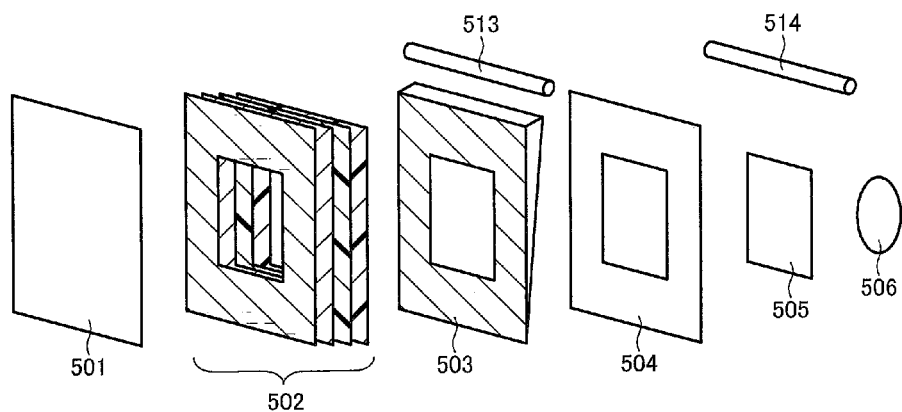
FIG. 16
Figure 17:
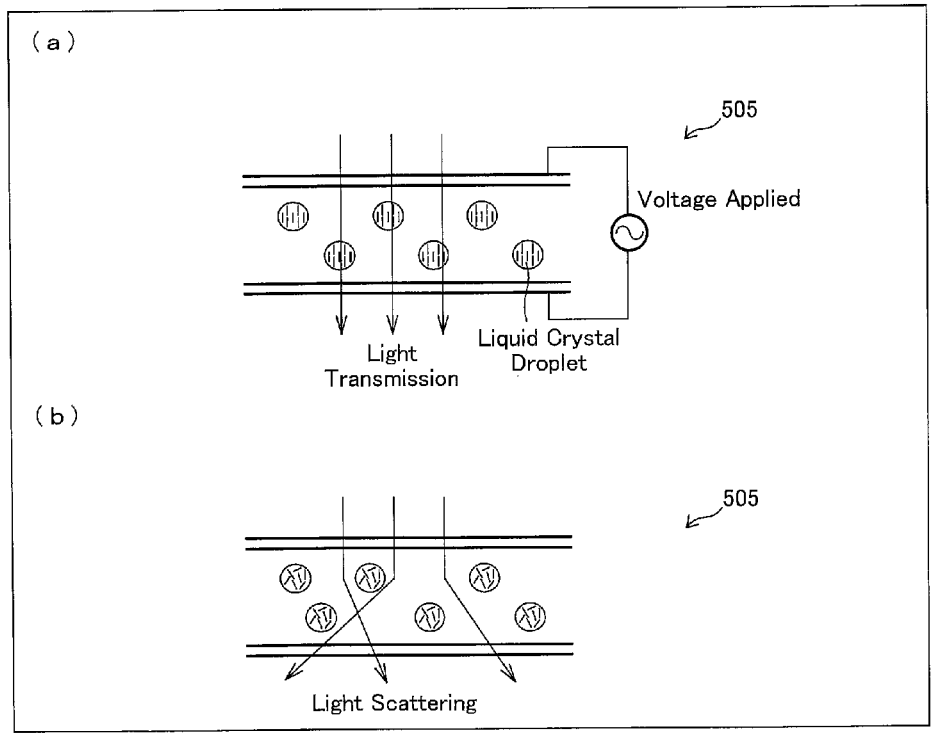
FIG. 17
Figure 18:
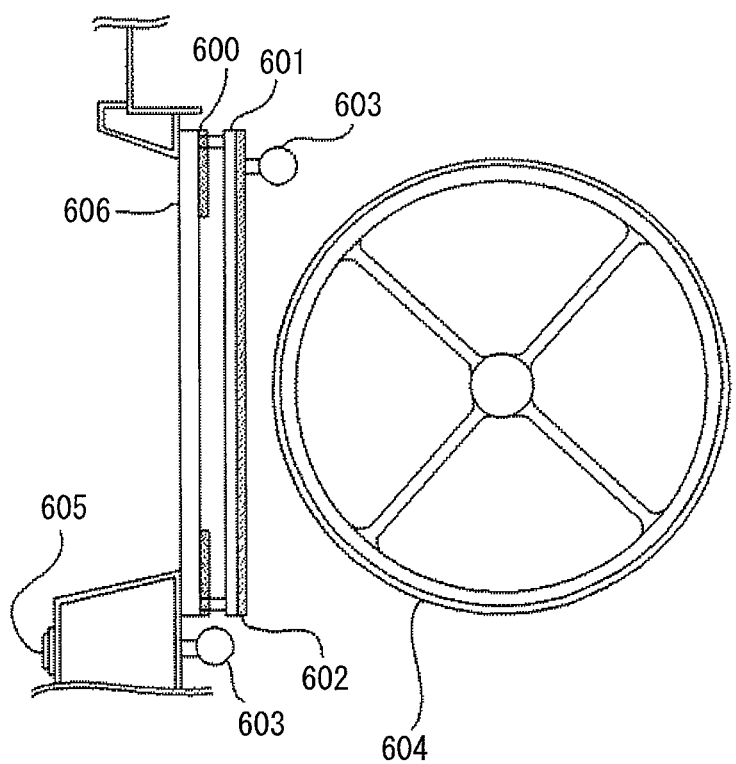
FIG. 18

The following description discusses an exemplary configuration in which a gaming device is incorporated into the liquid crystal display unit of the present invention, with reference to FIG. 12. FIG. 12 is a view schematically illustrating how the gaming device is configured.

As illustrated in FIG. 12, a gaming device 90, which is a common gaming device, includes on its front surface a circular game board 92 that shows how a game is developing. The game board 92 includes, at its substantially central portion, an information display section 94 which is mainly constituted by a liquid crystal display element.

According to the gaming device 90 of the present invention, the information display section 94 is constituted by a liquid crystal display unit described in the Embodiments.

A recent gaming device 90 is required to be capable of displaying, in its information display section 94, (i) information to be displayed on the liquid crystal display element and (ii) an accessory etc. provided behind the liquid crystal display element. Further, the liquid crystal display element tends to be required to display images with higher quality.

In this regard, the gaming device 90 of the present invention can provide a gaming device capable of displaying powerful images with higher quality by using a liquid crystal display unit and a control method for a liquid crystal display unit each of which is capable of (i) fully shielding an accessory provided behind a liquid crystal display element, (ii) achieving high uniformity of luminance, and (iii) achieving high use efficiency of a light source.

As so far described, a liquid crystal display unit of the present invention is configured such that the surface light source is movable, and the surface light source is moved (i) so that the accessory is shielded in a first case where the image, displayed by the first liquid crystal display element, is viewed by a primary viewer of the first liquid crystal display element and (ii) so that the accessory is not shielded in a second case where the accessory is viewed by the primary viewer.

As so far described, a control method for a liquid crystal display unit of the present invention is such that the surface light source is movable, and includes the steps of: causing the surface light source to move (i) so that the accessory is shielded in a first case where the image, displayed by the first liquid crystal display element, is viewed by the primary viewer and (ii) so that the accessory is not shielded in a second case where the accessory is viewed by the primary viewer.

Accordingly, it is possible to provide a liquid crystal display unit and a control method for a liquid crystal display unit, each of which is capable of fully shielding, with a simple configuration, the accessory provided behind the liquid crystal display device.

The embodiments discussed in the foregoing description of embodiments and concrete examples serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

Industrial Applicability

A liquid crystal display unit and a control method for a liquid crystal display unit of the present invention are capable of displaying both an image and an accessory. Accordingly, the liquid crystal display unit and the control method for a liquid crystal display unit of the present invention are suitably applicable to an amusement equipment such as a gaming device.

The invention claimed is:

1. A liquid crystal display unit, comprising:
a first liquid crystal display element for displaying an image;
an accessory provided behind the first liquid crystal display element; and
a surface light source provided between the first liquid crystal display element and the accessory,
the surface light source being movable,
the surface light source being moved (i) so that the accessory is shielded in a first case where the image, displayed by the first liquid crystal display element, is viewed by a primary viewer of the first liquid crystal display element and (ii) so that the accessory is not shielded in a second case where the accessory is viewed by the primary viewer,
in the first case, the surface light source is moved so as to backlight the first liquid crystal display element, and
in the second case, the surface light source is moved so as to irradiate the accessory with light emitted from the surface light source.

2. A liquid crystal display unit, comprising:
a first liquid crystal display element for displaying an image;
an accessory provided behind the first liquid crystal display element;
a surface light source provided between the first liquid crystal display element and the accessory; and
a second liquid crystal display element provided between the first liquid crystal display element and the surface light source,
the surface light source being movable,
the surface light source being moved (i) so that the accessory is shielded in a first case where the image, displayed by the first liquid crystal display element, is viewed by a primary viewer of the first liquid crystal display element and (ii) so that the accessory is not shielded in a second case where the accessory is viewed by the primary viewer, and
the second liquid crystal display element serving as a shutter.

3. The liquid crystal display unit according to claim 2, wherein, in the first case, the surface light source is moved so that a light-emitting surface of the surface light source faces a back surface of the first liquid crystal display element.

4. The liquid crystal display unit according to claim 2, wherein:
the first liquid crystal display element has a non-display region in which no image is displayed, and
in the second case, the surface light source is moved so as to be behind the non-display region when it is seen from the primary viewer.

5. The liquid crystal display unit according to claim 4, wherein the non-display region is located in a peripheral part of the first liquid crystal display element.

6. The liquid crystal display unit according to claim 2, wherein:
the surface light source includes a light-emitting element and a light-diffusing section, and the light-diffusing section diffuses, in a light-emitting surface of the surface light source, light emitted from the light-emitting element.

7. The liquid crystal display unit according to claim 6, wherein:
the surface light source further includes a reflecting section for causing the light emitted from the light-emitting element to be emitted through the light-emitting surface.

8. The liquid crystal display unit according to claim 7, wherein:
the reflecting section is provided on a back surface of the surface light source, the back surface being opposite to the light-emitting surface, and
the reflecting section includes a reflecting sheet.

9. The liquid crystal display unit according to claim 2, wherein:
the surface light source includes a rotation device; and
the rotation device rotates and moves the surface light source so as to cause the accessory to be shielded or the accessory not to be shielded.

10. The liquid crystal display unit according to claim 9, wherein the rotation device includes:
a rotation motor; and
a rotation control section for controlling rotation of the rotation motor.

11. The liquid crystal display unit according to claim 9, wherein:
the surface light source is divided into a plurality of regions on a light-emitting surface of the surface light source; and
each of the plurality of regions is independently rotatable on a side of a corresponding one of the plurality of regions, which side faces a borderline by which the surface light source is divided.

12. The liquid crystal display unit according to claim 11, wherein the surface light source is divided into two regions which are adjacent to each other in a horizontal direction when it is seen from the primary viewer.

13. The liquid crystal display unit according to claim 2, wherein the second liquid crystal display element is a polymer-dispersed liquid crystal display element.

14. A gaming device, comprising a liquid crystal display unit recited in claim 2.

15. A method of controlling a liquid crystal display unit, the liquid crystal display unit including:
a first liquid crystal display element for displaying an image;
an accessory provided behind the first liquid crystal display element; and
a surface light source provided between the first liquid crystal display element and the accessory,
said method switching between (i) displaying of the image displayed by the first liquid crystal display with respect to a primary viewer of the first liquid crystal display element and (ii) displaying of the accessory with respect to the primary viewer,
the surface light source being movable,
said method, comprising the steps of: causing the surface light source to move (i) so that the accessory is shielded in a first case where the image, displayed by the first liquid crystal display element, is viewed by the primary viewer and (ii) so that the accessory is not shielded in a second case where the accessory is viewed by the primary viewer,
in the first case, the surface light source is moved so as to backlight the first liquid crystal display element, and
in the second case, the surface light source is moved so as to irradiate the accessory with light emitted from the surface light source.

16. The method according to claim 15, wherein:
the liquid crystal display unit further includes a second liquid crystal display element provided between the first liquid crystal display element and the surface light source, the second liquid crystal display element serving as a shutter; and
said method further comprising the step of:
causing the second liquid crystal display element to serve as a closed shutter while the surface light source is moving.

17. The method according to claim 15, wherein:
the second liquid crystal display element which serves as the shutter is a polymer-dispersed liquid crystal display element; and
a state in which the second liquid crystal display element serves as the closed shutter corresponds to a state in which the polymer-dispersed liquid crystal display element is in a light-scattering state.

* * * * *